US012588095B2

(12) United States Patent
Yuan et al.

(10) Patent No.: US 12,588,095 B2
(45) Date of Patent: Mar. 24, 2026

(54) TRANSMISSION CONFIGURATION INDICATOR STATE MAPPING FOR MULTIPLE TRANSPORT BLOCK TRANSMISSION

(71) Applicant: QUALCOMM Incorporated, San Diego, CA (US)

(72) Inventors: Fang Yuan, Beijing (CN); Yan Zhou, San Diego, CA (US); Aleksandar Damnjanovic, Del Mar, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/560,151

(22) PCT Filed: Jul. 21, 2021

(86) PCT No.: PCT/CN2021/107543
§ 371 (c)(1),
(2) Date: Nov. 10, 2023

(87) PCT Pub. No.: WO2023/000195
PCT Pub. Date: Jan. 26, 2023

(65) Prior Publication Data
US 2024/0244702 A1     Jul. 18, 2024

(51) Int. Cl.
*H04W 76/20*      (2018.01)
*H04L 1/00*       (2006.01)
*H04W 72/12*      (2023.01)

(52) U.S. Cl.
CPC .......... *H04W 76/20* (2018.02); *H04L 1/0003* (2013.01); *H04W 72/12* (2013.01)

(58) Field of Classification Search
CPC ...... H04W 76/20; H04W 72/12; H04L 1/0003
See application file for complete search history.

(56) References Cited

U.S. PATENT DOCUMENTS 11,924,125 B2 *   3/2024  Wu ....................... H04L 5/0094
12,470,280 B2 *  11/2025  Kwak .................. H04B 7/0623
(Continued)

OTHER PUBLICATIONS

Ericsson: "PDSCH/PUSCH Enhancements", 3GPP Draft, R1-2104462, 3GPP TSG-RAN WG1 Meeting #105-e, vol. RAN WG1, No. e-Meeting, May 10, 2021-May 27, 2021, May 11, 2021 (May 11, 2021), XP052006205, pp. 1-26, subclause 2.1.3 Time domain resource allocation aspects subclause 2.1.10 Multi-PDSCH scheduling in multi-TRP transmission.
International Search Report and Written Opinion—PCT/CN2021/107543—ISA/EPO—Feb. 8, 2022, 15 Pages.
(Continued)

*Primary Examiner* — Jael M Ulysse
(74) *Attorney, Agent, or Firm* — Shumaker & Sieffert P.A

(57) ABSTRACT

Aspects of the disclosure relate to transmission configuration indicator (TCI) state mapping for multiple transport block (TB) transmission with downlink control information (DCI). In one example, a scheduled entity may receive a scheduling grant from a scheduling entity. The scheduling grant may include scheduling assignments configured to assign wireless resources for corresponding enabled communications. The scheduling grant may further include non-scheduling assignments without assigning wireless resources. The scheduling grant may further include a codepoint including TCI state indicators mapping the scheduling and non-scheduling assignments to corresponding TCI states. The scheduled entity may further receive a control message to activate the TCI states mapped to the corresponding indicators. Other aspects, embodiments, and features are also claimed and described.

30 Claims, 12 Drawing Sheets

(56) References Cited

U.S. PATENT DOCUMENTS

| | | | | |
|---|---|---|---|---|
| 2017/0078126 A1* | 3/2017 | Einhaus | ............... | H04L 1/0009 |
| 2020/0221487 A1* | 7/2020 | Lee | ....................... | H04L 5/0091 |
| 2020/0229161 A1* | 7/2020 | Raghavan | ............ | H04L 5/0048 |
| 2020/0267750 A1* | 8/2020 | Park | ....................... | H04B 7/024 |
| 2022/0272547 A1* | 8/2022 | Noh | ................... | H04B 7/15528 |
| 2022/0338235 A1* | 10/2022 | Bagheri | ............... | H04L 5/0094 |
| 2022/0346104 A1* | 10/2022 | Yi | ......................... | H04L 1/1614 |
| 2023/0247648 A1* | 8/2023 | Oh | ........................... | H04L 5/00 |
| | | | | 370/252 |
| 2024/0064527 A1* | 2/2024 | Matsumura | .......... | H04W 72/21 |
| 2024/0073919 A1* | 2/2024 | Ma | ........................ | H04L 5/0055 |
| 2024/0188098 A1* | 6/2024 | Matsumura | .......... | H04L 1/1896 |
| 2025/0106829 A1* | 3/2025 | Bhamri | ............ | H04W 72/0446 |
| 2025/0220679 A1* | 7/2025 | Bagheri | ............... | H04L 5/0044 |
| 2025/0344209 A1* | 11/2025 | Matsumura | .......... | H04W 76/20 |

OTHER PUBLICATIONS

SONY: "On Scheduling of Multiple DL/UL Transport Blocks", 3GPP Draft, R1-1912334, 3GPP TSG RAN WG1 #99, vol. RAN WG1, No. Reno, Nevada, USA, Nov. 18, 2019-Nov. 22, 2019, Nov. 9, 2019 (Nov. 9, 2019), XP051823351, 8 Pages, Retrieved from the Internet: URL:https://ftp.3gpp.org/tsg_ran/WG1_RL1/TSGR1_99/Docs/R1-1912334.zip R1-1912334 MTBG.docx [retrieved on Nov. 9, 2019] subclause 2 Use of scheduling gaps for multiple TBs.

ZTE Corporation: "Discussion on Cross-Carrier Scheduling with Different Numerologies", 3GPP Draft, R1-1904154, 3GPP TSG RAN WG1 Meeting #96bis, vol. RAN WG1, No. Xi'an, China, Apr. 8, 2019-Apr. 12, 2019, Apr. 7, 2019 (Apr. 7, 2019), XP051699490, pp. 1-8, Retrieved from the Internet: URL: http://www.3gpp.org/ftp/Meetings%5F3GPP%5FSYNC/RAN1/Docs/R1%2D1904154%2Ezip [retrieved on Apr. 7, 2019] subclause 2.2.2 QCL assumption.

* cited by examiner

1100

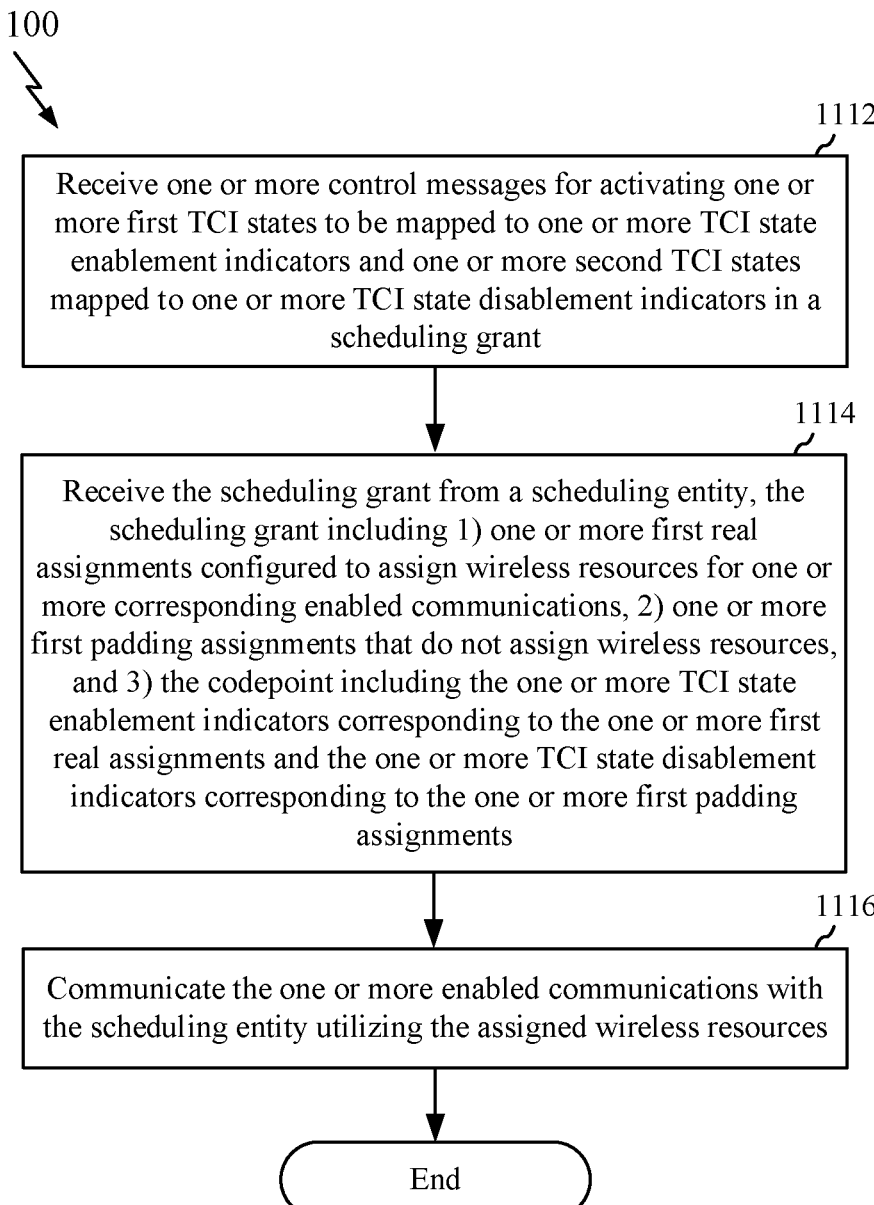

1112

Receive one or more control messages for activating one or more first TCI states to be mapped to one or more TCI state enablement indicators and one or more second TCI states mapped to one or more TCI state disablement indicators in a scheduling grant

1114

Receive the scheduling grant from a scheduling entity, the scheduling grant including 1) one or more first real assignments configured to assign wireless resources for one or more corresponding enabled communications, 2) one or more first padding assignments that do not assign wireless resources, and 3) the codepoint including the one or more TCI state enablement indicators corresponding to the one or more first real assignments and the one or more TCI state disablement indicators corresponding to the one or more first padding assignments

1116

Communicate the one or more enabled communications with the scheduling entity utilizing the assigned wireless resources End

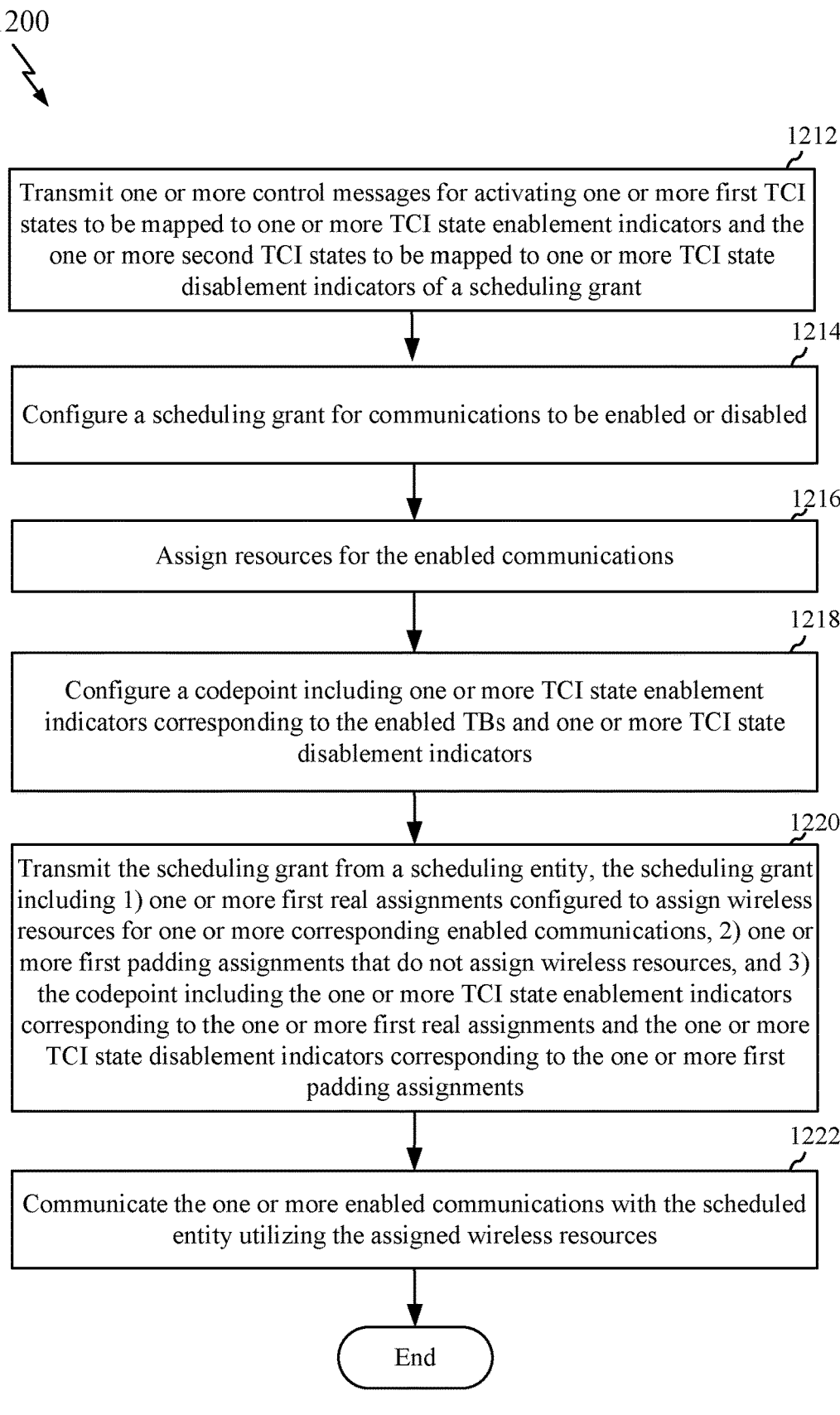

1212

Transmit one or more control messages for activating one or more first TCI states to be mapped to one or more TCI state enablement indicators and the one or more second TCI states to be mapped to one or more TCI state disablement indicators of a scheduling grant

1214

Configure a scheduling grant for communications to be enabled or disabled

1216

Assign resources for the enabled communications

1218

Configure a codepoint including one or more TCI state enablement indicators corresponding to the enabled TBs and one or more TCI state disablement indicators

1220

Transmit the scheduling grant from a scheduling entity, the scheduling grant including 1) one or more first real assignments configured to assign wireless resources for one or more corresponding enabled communications, 2) one or more first padding assignments that do not assign wireless resources, and 3) the codepoint including the one or more TCI state enablement indicators corresponding to the one or more first real assignments and the one or more TCI state disablement indicators corresponding to the one or more first padding assignments

1222

Communicate the one or more enabled communications with the scheduled entity utilizing the assigned wireless resources End

FIG. 12

TRANSMISSION CONFIGURATION INDICATOR STATE MAPPING FOR MULTIPLE TRANSPORT BLOCK TRANSMISSION

This application is a national stage application under 35 U.S.C. § 371 of PCT Application No. PCT/CN2021/107543, filed Jul. 21, 2021. The entire contents of PCT Application No. PCT/CN2021/107543 is incorporated herein by reference in its entirety.

TECHNICAL FIELD

The technology discussed below relates generally to wireless communication systems, and more particularly, to transmission configuration indicator (TCI) state mapping for multiple transport block (TB) transmission.

INTRODUCTION

As the demand for mobile broadband access continues to increase, research and development for effective beamforming based on a transmission configuration indicator (TCI) state and resource management with a downlink control information (DCI) message continue. The efforts to advance wireless communication technologies are made not only to meet the growing demand for mobile broadband access, but to advance and enhance the user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the disclosure generally relates to efficient transmission configuration indicator (TCI) state activation control using one or more non-scheduling assignments without assigning wireless resources in a single scheduling grant (e.g., downlink control information (DCI)). Thus, the scheduling entity may save unnecessary resources by using the non-scheduling assignments. At the same time, a scheduling grant may dynamically control activation and deactivation of one or more TCI states using one or more corresponding non-scheduling assignments in the scheduling grant.

Some aspects of the disclosure provide a method of wireless communication operable at a scheduled entity, a scheduled entity, and a computer-readable medium storing code for a scheduled entity, for efficient TCI state activation management. A scheduled entity may receive a scheduling grant from a scheduling entity. The scheduling grant may include one or more first scheduling assignments configured to assign wireless resources for one or more corresponding enabled communications, one or more first non-scheduling assignments that do not assign wireless resources, and a first codepoint. The first codepoint of the scheduling grant may include one or more first TCI state indicators corresponding to the one or more first scheduling assignments and one or more second TCI state indicators corresponding to the one or more first non-scheduling assignments. The scheduled entity may further communicate the one or more enabled communications with the scheduling entity utilizing the assigned wireless resources.

Further aspects of the disclosure provide a method of wireless communication operable at a scheduling entity, a scheduling entity, and a computer-readable medium storing code for a scheduling entity, for efficient TCI state activation management. A scheduling entity may transmit transmitting a scheduling grant from a scheduling entity. The scheduling grant may include one or more first scheduling assignments configured to assign wireless resources for one or more corresponding enabled communications, one or more first non-scheduling assignments that do not assign wireless resources, and a first codepoint. The first codepoint of the scheduling grant may include one or more first TCI state indicators corresponding to the one or more first scheduling assignments and one or more second TCI state indicators corresponding to the one or more first non-scheduling assignments. The scheduling entity may further communicate the one or more enabled communications with the scheduled entity utilizing the assigned wireless resources.

These and other aspects of the technology discussed herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

BRIEF DESCRIPTION OF THE DRAWINGS

FIG. 11 is a flow chart illustrating an exemplary process at a scheduled entity for multiple-communication assignments with a single scheduling grant and one or more control messages for mapping communications to TCI states according to some embodiments.

FIG. 12 is a flow chart illustrating an exemplary process at a scheduling entity for multiple-communication assignments with a single scheduling grant and one or more control messages for mapping communications to TCI states according to some embodiments.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

Figure 1:
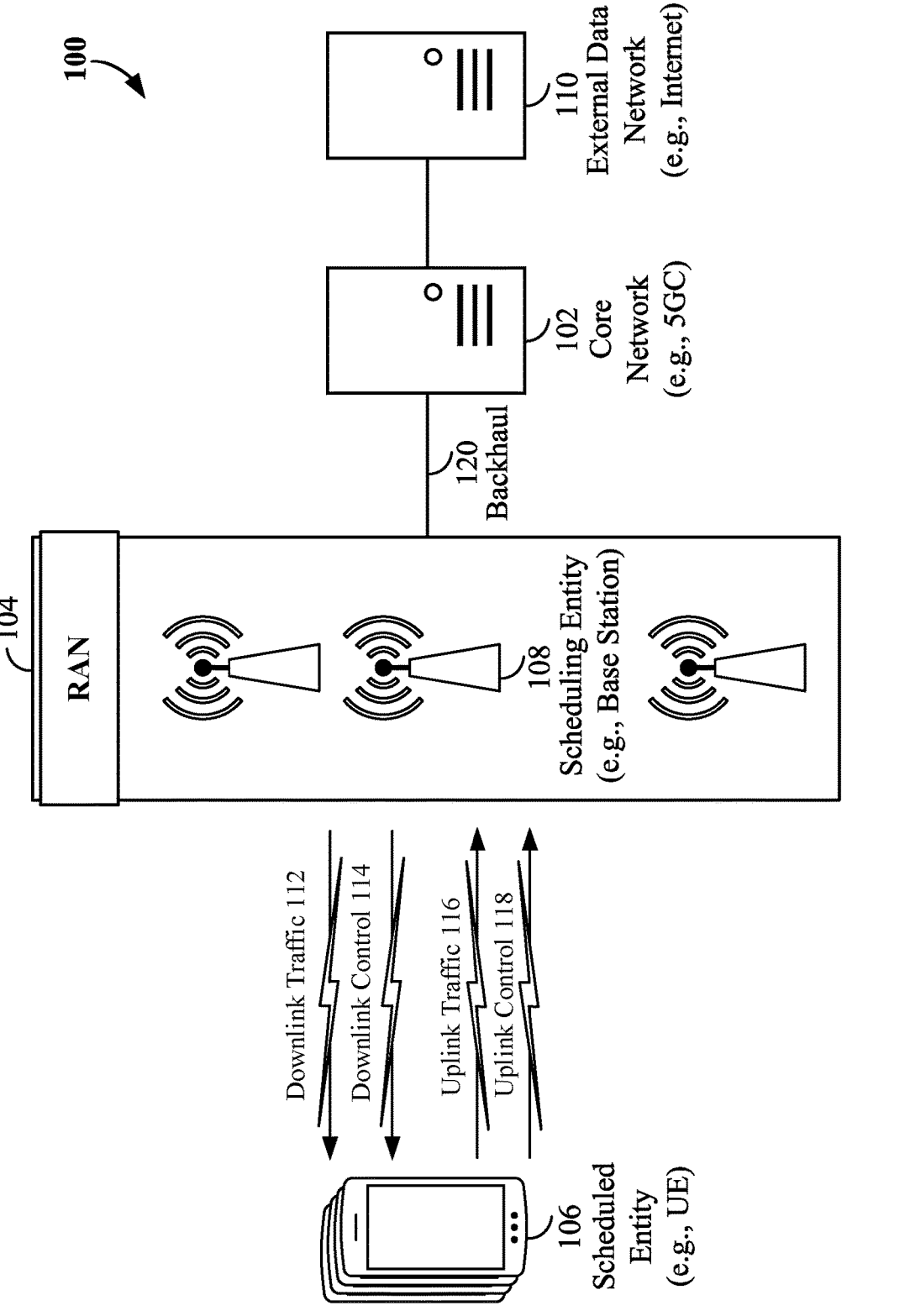
FIG. 1 is a schematic illustration of a wireless communication system according to some embodiments.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108. In some examples, the scheduling entity may transmit a scheduling grant including multiple resource assignments assigning resources for multiple communications (e.g., sets of one or more packets, such as transport blocks (TBs), in the uplink and/or downlink directions). Based on the scheduling grant, the scheduling entity may communicate the multiple communications with the scheduled entity. In some examples described further below, the scheduling entity may indicate a transmission configuration indicator (TCI) state of a transmission beam, indicating that the beam may have channel characteristics similar to those of another beam.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
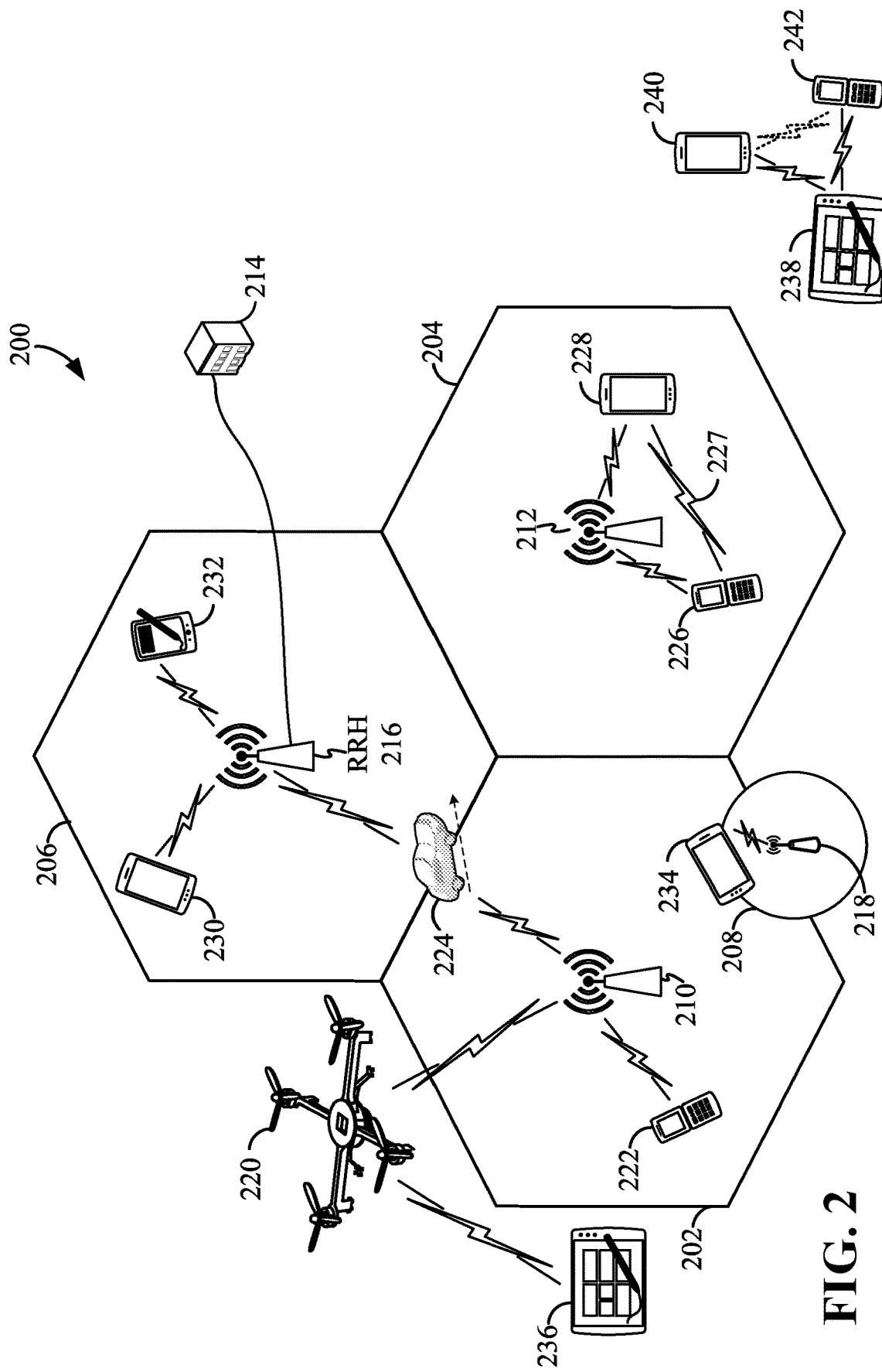
FIG. 2 is a conceptual illustration of an example of a radio access network according to some embodiments.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quad-copter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

Due to increased mobile communications between a scheduling entity and one or more scheduled entities, a scheduling entity may need effectively manage more data transmissions and resources. Within the present disclosure, as discussed further below, a scheduling grant (e.g., a downlink control information, DCI message) may assign resources for multiple communications (e.g., TBs) by providing multiple resource assignments in a scheduling grant. Furthermore, a scheduling grant may manage resources for multiple TB communications. The scheduling grant may map multiple communications to TCI states. Thus, the scheduled entity may know that the channel to be used for multiple communications may share some channel characteristics with those corresponding to a configured reference signal (e.g., there is a quasi-co-location relationship between the respective channels). This may result in higher data rates, capacity, and spectral efficiency.

Figure 3:
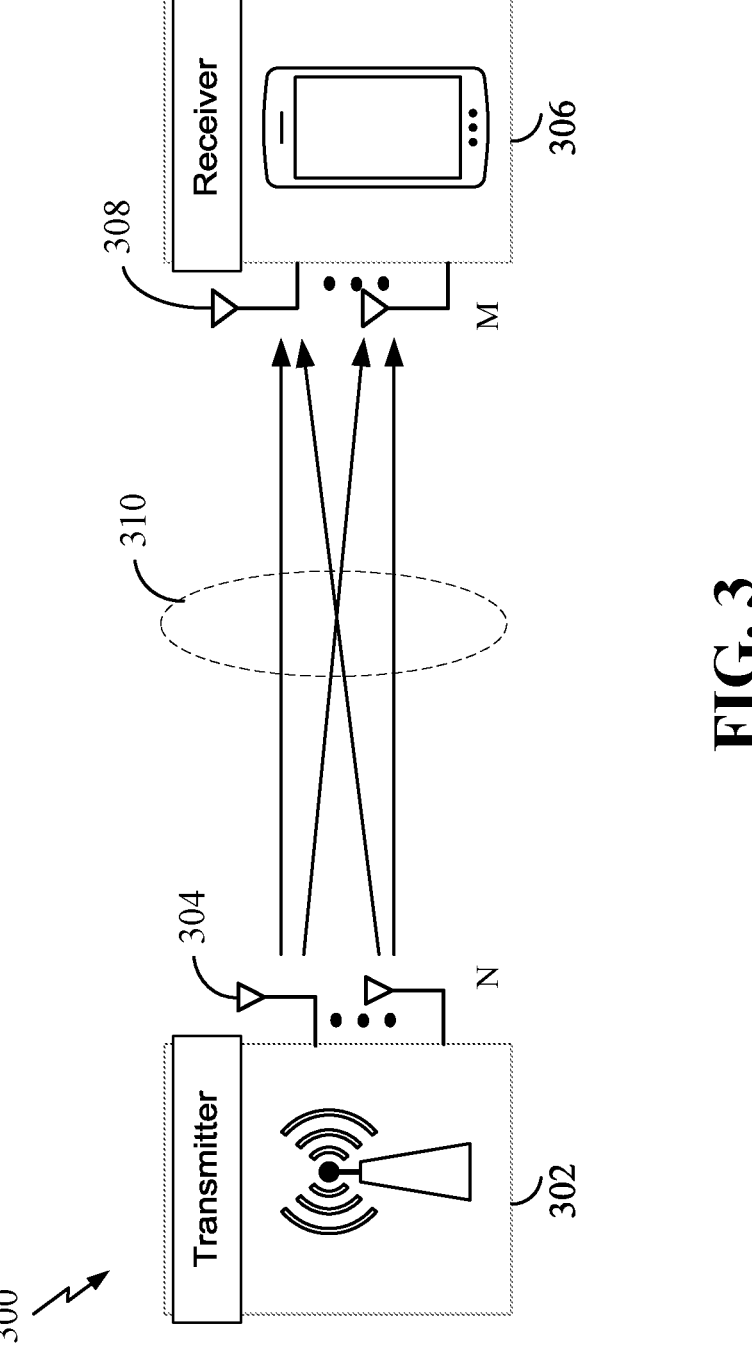
FIG. 3 is a block diagram illustrating a wireless communication system supporting multiple-input multiple-output (MIMO) communication according to some embodiments.

In some aspects of the disclosure, the scheduling entity and/or scheduled entity may be configured with multiple antennas for beamforming and/or multiple-input multiple-output (MIMO) technology. FIG. 3 illustrates an example of a wireless communication system 300 with multiple antennas, supporting beamforming and/or MIMO. The use of such multiple antenna technology enables the wireless communication system to exploit the spatial domain to support spatial multiplexing, beamforming, and transmit diversity.

Beamforming generally refers to directional signal transmission or reception. For a beamformed transmission, a transmitting device may precode, or control the amplitude and phase of each antenna in an array of antennas to create a desired (e.g., directional) pattern of constructive and destructive interference in the wavefront.

In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

In a MIMO system, spatial multiplexing may be used to transmit multiple different streams of data, also referred to as layers, simultaneously on the same time-frequency resource. In some examples, a transmitter 302 may send multiple data streams to a single receiver. In this way, a MIMO system takes advantage of capacity gains and/or increased data rates associated with using multiple antennas in rich scattering environments where channel variations can be tracked. Here, the receiver 306 may track these channel variations and provide corresponding feedback to the transmitter 302. In the simplest case, as shown in FIG. 3, a rank-2 (i.e., including 2 data streams) spatial multiplexing transmission on a 2×2 MIMO antenna configuration will transmit two data streams via two transmit antennas 304. The signal from each transmit antenna 304 reaches each receive antenna 308 along a different signal path 310. The receiver 306 may then reconstruct the data streams using the received signals from each receive antenna 308.

In some examples, a transmitter may send multiple data streams to multiple receivers. This is generally referred to as multi-user MIMO (MU-MIMO). In this way, a MU-MIMO system exploits multipath signal propagation to increase the overall network capacity by increasing throughput and spectral efficiency, and reducing the required transmission energy. This is achieved by a transmitter 302 spatially precoding (i.e., multiplying the data streams with different weighting and phase shifting) each data stream (in some examples, based on known channel state information) and then transmitting each spatially precoded stream through multiple transmit antennas to the receiving devices using the same allocated time-frequency resources. A receiver (e.g., receiver 306) may transmit feedback including a quantized version of the channel so that the transmitter 302 can schedule the receivers with good channel separation. The spatially precoded data streams arrive at the receivers with different spatial signatures, which enables the receiver(s) (in some examples, in combination with known channel state information) to separate these streams from one another and recover the data streams destined for that receiver. In the other direction, multiple transmitters can each transmit a spatially precoded data stream to a single receiver, which enables the receiver to identify the source of each spatially precoded data stream.

The number of data streams or layers in a MIMO or MU-MIMO (generally referred to as MIMO) system corresponds to the rank of the transmission. In general, the rank of a MIMO system is limited by the number of transmit or receive antennas 304 or 308, whichever is lower. In addition, the channel conditions at the receiver 306, as well as other considerations, such as the available resources at the transmitter 302, may also affect the transmission rank. For example, a base station in a RAN (e.g., transmitter 302) may assign a rank (and therefore, a number of data streams) for a DL transmission to a particular UE (e.g., receiver 306) based on a rank indicator (RI) the UE transmits to the base station. The UE may determine this RI based on the antenna configuration (e.g., the number of transmit and receive antennas) and a measured signal-to-interference-and-noise ratio (SINR) on each of the receive antennas. The RI may indicate, for example, the number of layers that the UE may support under the current channel conditions. The base station may use the RI along with resource information (e.g., the available resources and amount of data to be scheduled for the UE) to assign a DL transmission rank to the UE.

The transmitter 302 determines the precoding of the transmitted data stream or streams based, e.g., on known channel state information of the channel on which the transmitter 302 transmits the data stream(s). For example, the transmitter 302 may transmit one or more suitable reference signals (e.g., a channel state information reference signal, or CSI-RS) that the receiver 306 may measure. The receiver 306 may then report measured channel quality information (CQI) back to the transmitter 302. This CQI generally reports the current communication channel quality, and in some examples, a requested transport block size (TBS) for future transmissions to the receiver. In some examples, the receiver 306 may further report a precoding matrix indicator (PMI) to the transmitter 302. This PMI generally reports the receiver's 306 preferred precoding matrix for the transmitter 302 to use, and may be indexed to a predefined codebook. The transmitter 302 may then utilize this CQI/PMI to determine a suitable precoding matrix for transmissions to the receiver 306.

In Time Division Duplex (TDD) systems, the UL and DL may be reciprocal, in that each uses different time slots of the same frequency bandwidth. Therefore, in TDD systems, a transmitter 302 may assign a rank for DL MIMO transmissions based on an UL SINR measurement (e.g., based on a sounding reference signal (SRS) or other pilot signal transmitted from the receiver 306). Based on the assigned rank, the transmitter 302 may then transmit a channel state information reference signal (CSI-RS) with separate sequences for each layer to provide for multi-layer channel estimation. From the CSI-RS, the receiver 306 may measure the channel quality across layers and resource blocks. The receiver 306 may then transmit a CSI report (including, e.g., CQI, RI, and PMI) to the transmitter 302 for use in updating the rank and assigning resources for future DL transmissions.

In some examples, a transmitter 302 may exploit a TCI state to indicate which beam the transmitter 302 or the receiver 306 is using for a transmission. Specifically, a transmitter 302 may indicate that a transmission is allocated to resources in a certain PDSCH/PUSCH that uses the same transmission beam as a configured reference signal (e.g., CSI-RS or SS block) based on a TCI state. Thus, the receiver 306 may know that a transmission beam for a transmission shares similar channel characteristics to a reference signal based on a TCI state. For example, a transmitter 302 may transmit a list of TCI states to a receiver 306 via an RRC message to decode PDSCH/PUSCH according to a detected PDCCH with DCI. A TCI state may contain parameters for configuring a quasi co-location (QCL) relationship between a configured downlink reference signal (e.g., CSI-RS or SS block) and a certain PDSCH/PUSCH. That is, properties of the channel on which the PDSCH/PUSCH is transmitted can be inferred from the channel over which the downlink reference signal is transmitted. Then, the transmitter 303 may activate or deactivate TCI states via a control message (e.g., a MAC-CE message). If a control message deactivates a TCI state, a scheduling grant (e.g., a DCI message) may not map the TCI state to a codepoint in the scheduling grant. If a control message activates a TCI state, a scheduling grant may map the TCI state to a TCI state indicator of a TCI codepoint in the scheduling grant. Thus, if a TCI state is activated, a TCI state indicator of a TCI codepoint in a scheduling grant may map the corresponding TCI state to a resource assignment for a corresponding communication (e.g., a TB or a set of TBs).

Figure 4:
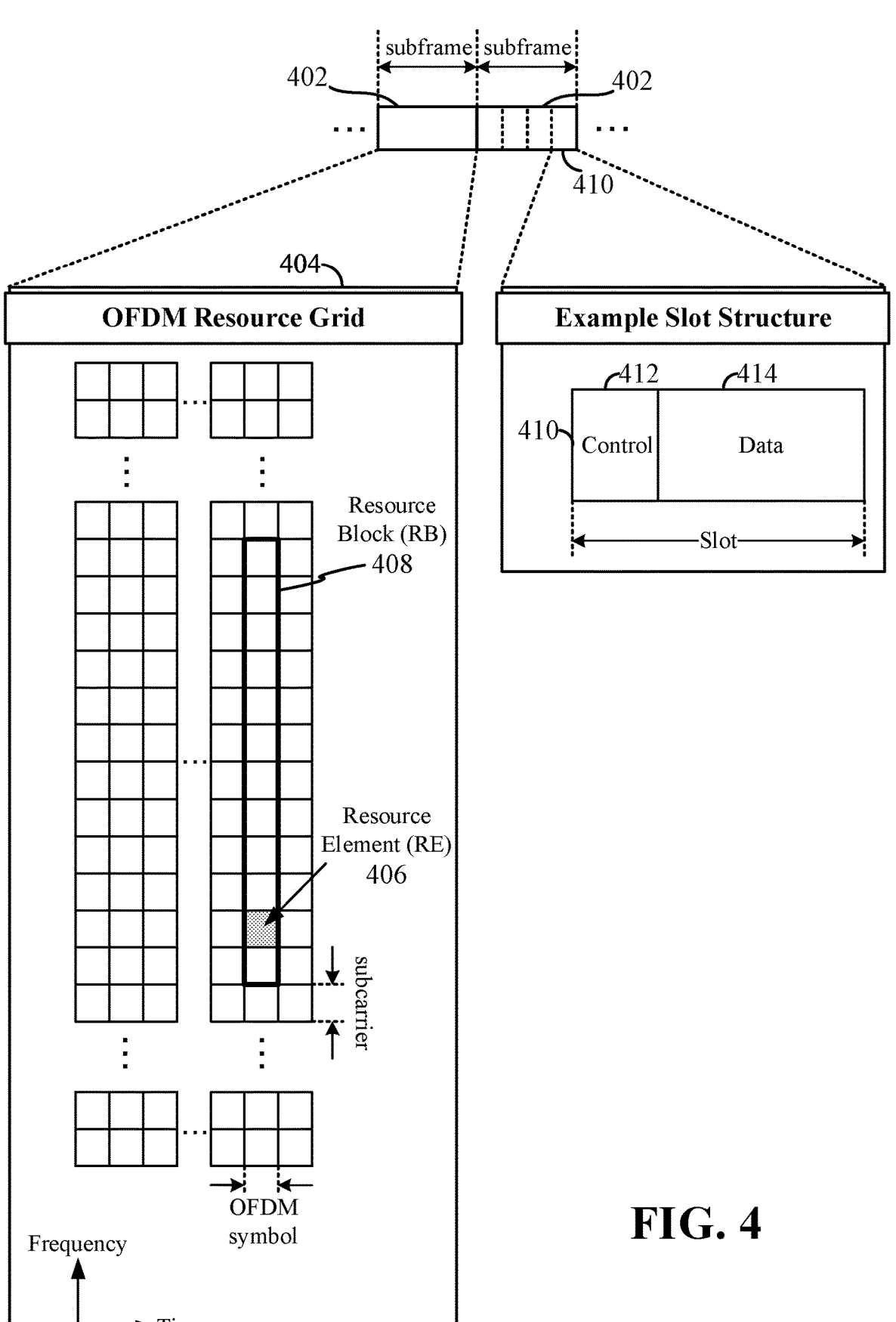
FIG. 4 is a schematic illustration of an organization of wireless resources in an air interface utilizing orthogonal frequency divisional multiplexing (OFDM) according to some embodiments.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 408 entirely corresponds to a single direction of communication (either transmission or reception for a given device).

A UE generally utilizes only a subset of the resource grid 404. An RB may be the smallest unit of resources that a scheduler can allocate to a UE. Thus, the more RBs scheduled for a UE, and the higher the modulation scheme chosen for the air interface, the higher the data rate for the UE.

In this illustration, the RB 408 occupies less than the entire bandwidth of the subframe 402, with some subcarriers illustrated above and below the RB 408. In a given implementation, the subframe 402 may have a bandwidth corresponding to any number of one or more RBs 408. Further, the RB 408 is shown occupying less than the entire duration of the subframe 402, although this is merely one possible example.

Each 1 ms subframe 402 may consist of one or multiple adjacent slots. In FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a normal CP. In some examples, a slot may include 12 OFDM symbols with an extended CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. In some examples, one slot may include one or two PDSCHs or PUSCHs. The one or two PDSCHs or PUSCHs in a slot may correspond to one or two transport blocks (TBs). The simple structure illustrated in FIG. 4 is merely exemplary in nature, and different slot structures may be utilized, and may include one or more of each of the control region(s) and data region(s).

Although not illustrated in FIG. 4, the various REs 406 within an RB 408 may carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry one or more DL control channels. These DL control channels may include a DL control information 114 (DCI) message that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station may transmit the synchronization signals PSS and SSS (collectively referred to as SS), and in some examples, the PBCH, in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry a downlink control information (DCI) message for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc. In some examples, the scheduled entity may use HARQ ACK/NACK feedback for acknowledging a received DCI message, which includes multiple resource assignments and/or received TBs.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

In some examples, a physical layer may generally multiplex and map these physical channels described above to transport channels for handling at a medium access control (MAC) layer entity. Transport channels carry blocks of information called transport blocks (TB). A physical channel (e.g., PDSCH, PUSCH) in a given slot may include one or more TBs. In some examples, a DCI may include multiple resource assignments for multiple corresponding TBs on corresponding physical channels (e.g., PDSCHs or PUSCHs). The transport block size (TBS), which may correspond to a number of bits of information, may be a controlled parameter, based on the modulation and coding scheme (MCS) and the number of RBs in a given transmission.

Figure 5:
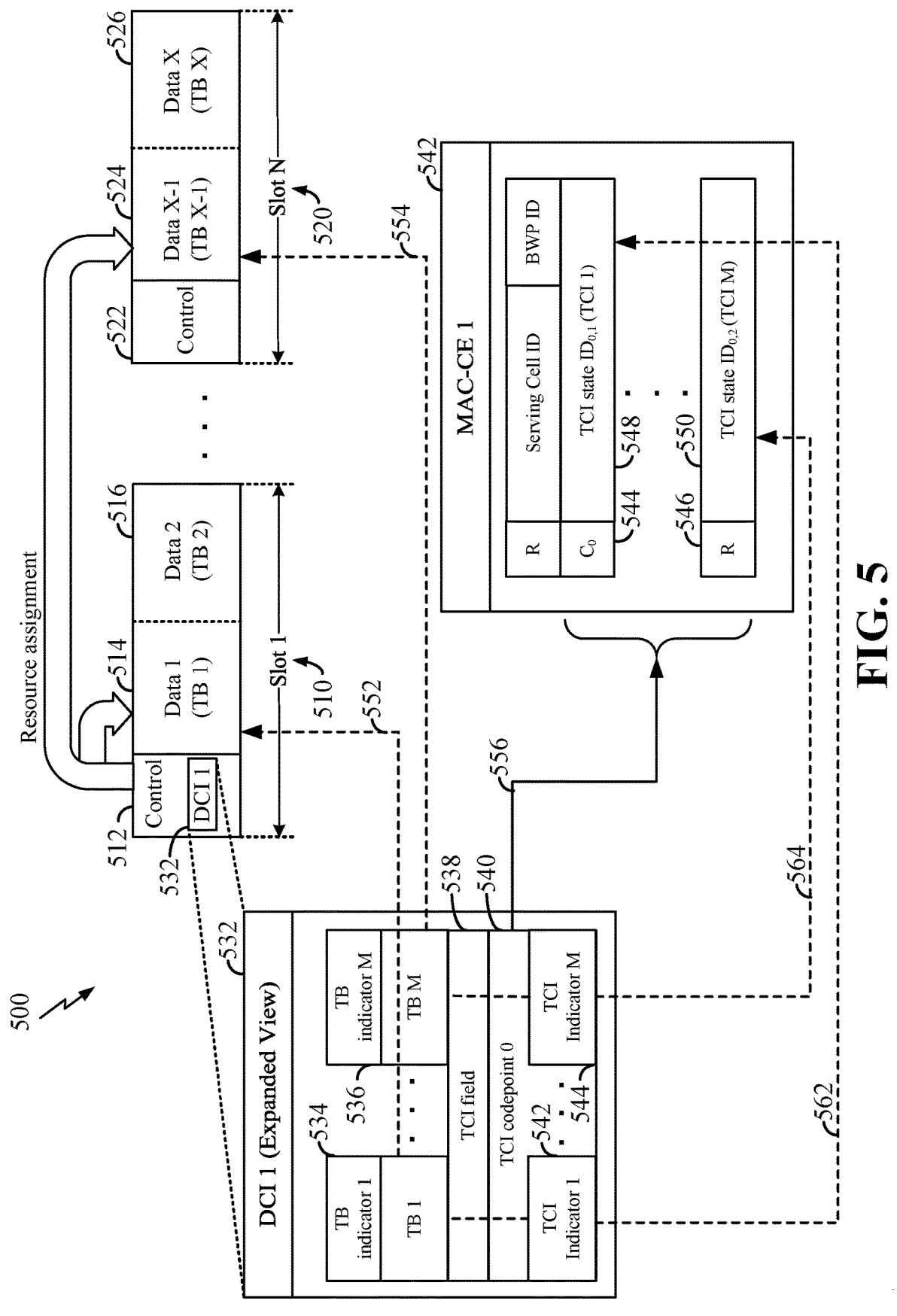
FIG. 5 is a conceptual illustration of an example of a multiple-communication resource assignment and its transmission configuration indicator (TCI) state mapping according to some embodiments.

FIG. 5 is a conceptual illustration of an example of a multiple-communication resource assignment and its transmission configuration indicator (TCI) mapping in accordance with some aspects of the present disclosure. As used herein, a communication may include but is not limited to a transport block (TB), a set of any suitable number of one or more TBs, a packet or set of packets, a protocol data unit (PDU) or set of PDUs, etc. In the example illustrated in FIG. 5, control signaling carries resource assignment information for multiple communications 514, 524 on multiple slots 510, 520.

As explained above in relation to FIG. 4, a slot 510 may include a control region 512 and data region(s) 514, 516. The control region 512 may carry a control channel (e.g., physical downlink control channel (PDCCH)). For example, a control channel in a control region 512 may carry a scheduling grant 532 (e.g., a downlink control information (DCI) message, or DCI), illustrated in an expanded view for convenience of description. A scheduling grant 532 may be configured to assign, schedule, or grant wireless resources for one or more communications over the data region(s) (e.g., including a physical downlink shared channel (PDSCH), or a physical uplink shared channel (PUSCH)) 514, 516. In some examples, a data channel (e.g., PDSCH or PUSCH) within a slot 510 may carry one or more entire TB(s) (e.g., TBs not divided among multiple slots or data channels). In some examples, a DCI message 532 may indicate a downlink (DL) resource assignment for assigning DL resources to carry a communication that includes one or more TBs 514, 524 on a PDSCH (e.g., using DCI Format 1_0, DCI Format 1_1, or DCI Format 1_2 as specified in 3GPP technical specifications for 5G NR). And in some examples, a DCI message 532 may indicate an uplink (UL) resource assignment for assigning UL resources to carry a communication that includes one or more TBs 514, 524 on a PUSCH (e.g., using DCI Format 0_0, DCI Format 0_1, or DCI Format 0_2 as specified in 3GPP technical specifications for 5G NR). 3GPP technical specifications for 5G NR have specified the DCI Formats to accommodate different purposes. DCI Format 0_ may be for uplink resource allocations, while DCI Format 1_ may be for downlink resource allocations. For example, DCI Format 0_0 may be used for the scheduling of PUSCH in one cell. DCI Format 0_1 may be used for the scheduling of one or multiple PUSCH in one cell. DCI Format 0_2 may be used for the scheduling of one PUSCH in one cell with a different resource allocation scheme. DCI Format 1_0 may be used for the scheduling of PDSCH in one cell. DCI Format 1_1 may be used for the scheduling of one or multiple PDSCH in one cell. DCI Format 0_2 may be used for the scheduling of one PUSCH in one cell with a different resource allocation scheme.

In some examples, a single scheduling grant 532 (e.g., a single DCI message carried in the control region 512) may include multiple resource assignments assigning resources to carry multiple communications (e.g., multiple TBs and/or multiple sets of TBs) 514, 524 in multiple slots 510, 520. That is, the scheduling grant 532 may include multiple resource assignments corresponding to data regions 514, 524 in multiple slots 510, 520. For example, the scheduling entity may transmit a single scheduling grant 532 configured to assign resources for a first communication (e.g., a first TB 514 or a first set of TBs) on a first PDSCH/PUSCH in a first slot 510. The scheduling grant 532 may further assign resources for a second communication (e.g., a second TB 524 or a second set of TBs) on a second PDSCH/PUSCH in a second slot 520. The scheduling grant 532 may further include one or more fields 534, 536 (e.g., HARQ process identifier (ID), modulation and coding scheme (MCS), redundancy version ID (RVID), new data indicator (NDI), time domain resource assignment (TDRA), and/or frequency domain resource assignment (FDRA)) for one or more corresponding TBs 514, 524. It should be appreciated that this is merely an example for multiple assignments with a single scheduling grant. In some examples, the scheduling grant 532 may include any suitable number of N assignments for N communications 514, 524 on corresponding N sets of one or more PDSCHs/PUSCHs over multiple slots. In some examples, the scheduling grant 532 may include multiple assignments for corresponding communications 514, 516 in a slot 510. In other examples, a scheduling grant may assign resources for a single corresponding communication in a single slot. In some examples, a multiple-communication assignment for multiple communications may apply to 120 kHz, 480 KHz, or 960 KHz. It should be appreciated that the subcarrier spacing (SCS) may be any suitable SCS.

In some examples, each slot of multiple slots scheduled by a single scheduling grant 532 may contain one or more entire TB(s) 514, 524 (e.g., TBs that are not divided over multiple slots). For example, a scheduling entity may transmit, to a scheduled entity, a single scheduling grant 532 (e.g., using DCI Format 1_0, DCI Format 1_1, or DCI Format 1_2) for assigning DL resources for a first communication on a first PDSCH 514 in a first slot 510, and for assigning other DL resources for a second communication on a second PDSCH 524 in a second slot 520. In some examples, a scheduling entity may transmit, to a scheduled entity, a single scheduling grant 532 (e.g., using DCI Format 0_0, DCI Format 0_1, or DCI Format 0_2) for assigning UL resources for a first communication on a first PUSCH 514 in a first slot 510, and for assigning UL resources for a second communication on a second PUSCH 524 in a second slot 520. In other examples, a slot 510 may carry two or more data channels 514, 516 (e.g., PDSCHs, PUSCHs) for two or more corresponding communications. In some examples, the scheduling grant 532 may assign resources for two communications on two corresponding data channels 514, 516 (e.g., PDSCHs, PUSCHs) in a single slot. In other examples, the scheduling grant 532 may assign resources for two communications on two corresponding data channels 514, 516 (e.g., PDSCHs, PUSCHs) over corresponding slots. Thus, the scheduling grant 532 may assign resources for a communication on a single data channel (e.g., PDSCH, PUSCH) in a slot. However, it should be appreciated that the number of data channels in a slot is not limited to one or two data channels 514, 516. Further, the number of communications in a data channel 514, 156 (e.g., PDSCH, PUSCH) is not limited to one communication. A single data channel 514, 516 (e.g., PDSCH, PUSCH) may carry more than one communication.

In some examples, a single scheduling grant may not assign resources on both PDSCH(s) and PUSCH(s) for corresponding communications. In other examples, a single scheduling grant may assign resources on both PDSCH(s) and PUSCH(s) for corresponding communications. In some examples, a single scheduling grant may not schedule a single communication to multiple slots where the scheduling is not by repetition. However, in other examples, a single scheduling grant may schedule a single communication over multiple slots, where the scheduling is not by repetition. In some examples, a single scheduling grant may not schedule multiple communications, where a communication is repeated over multiple slots (or mini-slots). However, in other examples, a single scheduling grant may schedule multiple communications, where a communication is repeated over multiple slots (or mini-slots). However, it should be appreciated that the multiple-communication assignments with a single scheduling grant may not prevent the scheduling entity from performing slot aggregation and/or repetition for PDSCH and/or PUSCH carrying communications scheduled by a single scheduling grant. For example, the scheduling grant 5312 may exploit slot aggregation and/or repetition for repeating a communication on resources over consecutive slots.

In some examples, a scheduling grant 532 may further include a transmission configuration indicator (TCI) field 540 that provides a TCI codepoint. Here, a TCI codepoint of a TCI field 540 indicates one or more TCI states configured at a scheduled entity, such that one or more communications 514, 524 are mapped to the indicated TCI state(s). In some examples, a TCI codepoint in a scheduling grant 532 may include one or more TCI state indicators 542, 544 mapping one or more communication indicators 534, 536 to one or more corresponding TCI states. The scheduling grant may map one or more communication indicators 534, 536 to one or more corresponding communications 514, 524. In some examples, the one or more communication indicators 534, 536 may correspond to one or more communication assignments in a scheduling grant 532.

In some examples, a scheduling entity may transmit a TCI-related parameter for a scheduled entity to configure a number of TCI states before the scheduling entity transmits the scheduling grant 532. The scheduling entity may transmit the TCI-related parameter via any suitable message or signal, including but not limited to a RRC message, a MAC-CE message, a DCI message, etc. In some examples, a TCI state may indicate which beam a scheduling entity is using for the transmission for a communication. Specifically, a scheduling entity may indicate that a communication 514, 524 is allocated to resources in a certain PDSCH/PUSCH that uses the same transmission beam as a configured reference signal (e.g., CSI-RS or SS block) based on a TCI state. Thus, the scheduled entity may know that a transmission beam for a communication 514, 524 shares similar channel characteristics to a reference signal based on a TCI state. A TCI state may contain parameters for configuring a QCL relationship between a configured downlink reference signal (e.g., CSI-RS or SS block) and a PDSCH/PUSCH for a communication (e.g., a TB or a set of TBs). In some examples, before a scheduling entity transmits a scheduling grant 532, the scheduling entity may transmit a control message 542 (e.g., a MAC-CE message) to activate or deactivate one or more TCI states. Then, a scheduling grant 532 may map one or more communication indicators 534, 536 of a codebook 540 to one or more corresponding activated TCI states. However, a scheduling grant 532 may not map one or more communication indicators 534, 536 of a codebook 540 to one or more corresponding deactivated TCI states.

In some instances, a TCI state mapped in a TCI codepoint may correspond to a transmission/reception point (TRP) or panel transmission. Here, a single panel transmission may indicate that a set of antenna ports having the equal antenna space among the antenna ports transmit signals with the same phase. Multi-panel transmissions may indicate that multiple sets of antenna ports having a different antenna space between panels from an antenna space within each panel transmit signals transmit signals having different signal paths. For example, if one TCI state is mapped in a TCI codepoint 540, a single TRP or panel transmission may exist. If two TCI states are mapped in a TCI codepoint, multiple TRPs or panel transmissions may exist. In some examples, a reserved bit 544 may determine a single TRP/panel transmission or multiple-TRP/panel transmissions. In some examples, a TRP/panel transmission may correspond to a TB or a set of TB transmission or reception.

For example, the scheduling entity may transmit a single scheduling grant 532 including a first assignment for assigning resources to carry communication 1 (514). The single scheduling grant 532 may further include a second assignment for assigning resources to carry communication 2 (524). The single scheduling grant 532 may include communication indicator 1 (534) to be mapped to communication 1 (514). Communication indicator 1 (534) may include modulation and coding scheme (MCS), redundancy version (RV), and/or new data indicator (NDI) to indicate whether communication 1 (514) is enabled or disabled. The single scheduling grant 532 may also include communication indicator 2 (536) to point to communication 2 (524). Communication indicator 2 (536) may include modulation and coding scheme (MCS), redundancy version (RV), and/or new data indicator (NDI) to indicate whether communication 2 (524) is enabled or disabled. The single scheduling grant 532 may also include a TCI field 538. The TCI field 538 may include TCI codepoint 0 (540) including TCI state indicator 1 (542) and TCI state indicator 2 (544). TCI codepoint 0 (540) may point to TCI states configured in a scheduled entity. In particular, TCI state indicator 1 (542) in TCI codepoint 0 (540) may map communication indicator 1 (534) to TCI state 1, and TCI state indicator 2 (544) in TCI codepoint 0 (540) may map communication indicator 2 (536) to TCI state 2. Communication indicators 1 and 2 (534, 536) may point to communications 1 and 2 (514 and 524). It should be appreciated that this is a mere example for multiple assignments with a single scheduling grant 532. In some examples, the single scheduling grant 532 may include any suitable number of M assignments for corresponding M communications 514, 524. The single scheduling grant 532 may include M communication indicators 534, 536 indicating corresponding M communications 514, 524. The single scheduling grant 532 may also include a TCI codepoint 540 including M TCI state indicators 542, 544 mapping M communication indicators to M corresponding TCI states. M communication indicators may point to M corresponding communications. Thus, the M TCI state indicators 542, 544 may map M corresponding communications to M corresponding TCI states.

In further examples, a scheduling entity may transmit a control message 542 (e.g., an activation command, a MAC-CE message, or MAC-CE) for activating or deactivating one or more TCI states corresponding to one or more communications 514, 524. For example, a MAC-CE message may activate the TCI states for each TCI codepoint in a scheduling grant (e.g., DCI). The scheduling entity may transmit a control message 542 via any suitable message or signal, including but not limited to a MAC-CE message, a RRC message, a DCI message, etc. The control message 542 may activate or deactivate one or more configured TCI states for one or more corresponding PDSCHs/PUSCHs for one or more corresponding communications 514, 524. In some examples, after the activation or deactivation of TCI states of a TCI codepoint, a scheduling entity may transmit a scheduling grant indicating the TCI codepoint and a multiple-communication scheduling. A scheduled entity may map the activated TCI states indicated by the TCI codepoint to multiple communications.

In some examples, a control message 542 may include a TCI state ID field, a reserved field, a serving cell ID field, and/or a bandwidth part ID. In some instances, the TCI state ID field may indicate a configured TCI state for a corresponding TCI state indicator in a TCI codepoint of a scheduling grant. In some examples, the reserved field 544 may indicate a number of existing TCI state IDs. For example, if a reserved field 544 (e.g., $C_0$) in a control message 542 is '1,' two TCI state IDs 548, 550 (TCI state $ID_{0,1}$, TCI state $ID_{0,2}$) may be present. However, if a reserved field in a control message 542 is '0,' one 550 (TCI state $ID_{0,2}$) of two TCI state IDs 648, 550 (TCI state $ID_{0,1}$, TCI state $ID_{0,2}$) may not be present. That is, a control message 542 may activate a TCI by indicating a corresponding TCI ID 548, 550. Thus, a single control message 542 may jointly activate TCIs by indicating the TCIs for all TCI codepoints to be indicated in scheduling grants. In some examples, the control message 542 may activate or deactivate a TCI state using the reserved field 544 by determining a number of existing TCI state IDs. In the example above, a reserved field 542 (e.g., $C_0$) in a control message 542 with a value '0' may deactivate a TCI state (TCI state $ID_{0,2}$). In other examples, the control message 542 may use a predetermined value or symbol to activate or deactivate a TCI state mapped to a corresponding TCI state indicator of a codepoint in a scheduling grant 532. For example, the control message 542 may use a value of '1' to activate a TCI state and a value of '0' to deactivate the TCI state.

In some examples, a control message 542 may activate or deactivate one or two TCI states 548, 550 mapped to a codepoint to be indicated in a scheduling grant 532. A scheduling grant 532 may map the TCI codepoint 540 to one or two assignments 534, 536 for communications 514, 524 through one or two communication indicators 534, 536 of the codepoint to the one or two corresponding TCI states. In other example, a control message 542 may activate or deactivate more than two TCI states 548, 550 mapped to the codepoint to be indicated in the scheduling grant 532. A TCI codepoint 540 in a scheduling grant 532 may map more than two assignments for communications 514, 524 to the more than two TCI states. In some examples, a control message 542 may activate or deactivate multiple TCI states mapped to multiple TCI codepoints corresponding to multiple scheduling grants.

In some instances, the serving cell ID field may indicate the identity of a serving cell (e.g., scheduled entity) for which the control message 542 applies. The BWP ID field may indicate a DL BWP for which the control message 542 applies as the TCI codepoint of the DCI bandwidth part indicator field. Here, it should be appreciated that the BWP is a mere example. It may be any suitable frequency. In some examples, it may be any number of suitable resources on a given carrier. Examples of the resource may include a resource block, a subcarrier, a frequency spectrum (channel or carrier), a time slot or subframe of a TDD/FDD component carrier, a spreading code, a precoder, and/or other suitable resources commonly used for transmissions.

Figure 6:
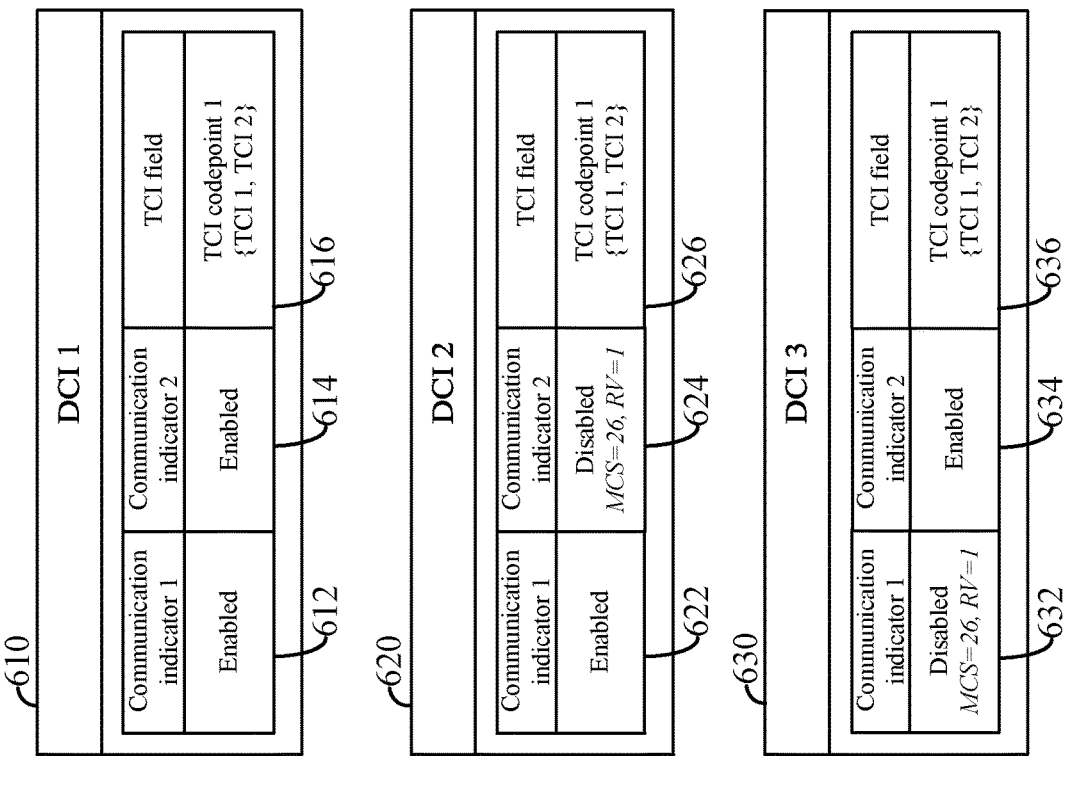
FIG. 6 is a schematic illustration of an example of scheduling grants for multiple resource assignments for multiple communications according to some embodiments.
Figure 6:
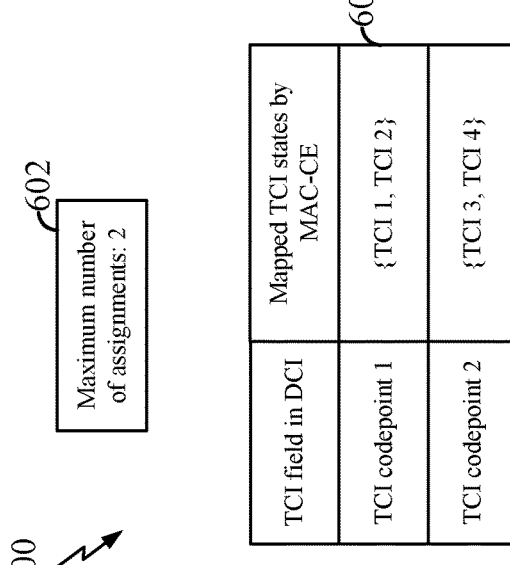

FIG. 6 is a schematic illustration showing some aspects of an example of a scheduling grant (e.g., a DCI message) for multiple resource assignments for multiple communications (e.g., multiple TBs or multiple sets of TBs). In some examples, using a non-scheduling assignment 624, 632 in multiple-communication assignments in a scheduling grant 620, 630 may improve efficiency of mapping to a TCI codepoint 626, 636 of TCI states. For example, a first single scheduling grant can schedule up to two (2) communications (communication 1, communication 2). Communication 1 for panel 1 and communication 2 for panel 2 may correspond to TCI state 1 and TCI state 2, respectively. Then, a first TCI codepoint may map assignment 1 for communication 1 and assignment 1 for communication 2 to TCI state 1 and TCI state 2, respectively. A second single scheduling grant can schedule up to two (2) communications (communication 1, communication 2). Communication 1 for panel 1 may correspond to TCI state 1. Then, a second TCI codepoint may map assignment 1 for communication 1 to TCI state 1. A third single scheduling grant can schedule up to two (2) communications (communication 1, communication 2). Communication 2 for panel 2 may correspond to TCI state 2. Then, a third TCI codepoint may map assignment 2 for communication 2 to TCI state 2. Thus, three codepoints may map three sets of communications (1st: communication 1 and communication 2, 2nd: communication 1, and 3rd: communication 2) to three sets of TCI states (1st: TCI 1 and TCI 2, 2nd: TCI 1, and 3rd: TCI 2). FIG. 6 illustrates reducing unnecessary TCI codepoints by using non-scheduling assignments. This may improve efficiency of mapping TCI states into a TCI codepoint and reduce DCI overhead.

For a multiple-communication assignment, the scheduling entity may transmit a configured maximum number 602 of multiple assignments for enabling multiple assignments with a single scheduling grant 610 for multiple communications 612, 614. The configured maximum number of assignments may be a maximum number of possible assignments per scheduling grant for corresponding communications. In an example shown in FIG. 6, the scheduling entity may determine a configured maximum number 602 of assignments as two (2). That is, there would be two (2) possible assignments for corresponding two (2) communications 612, 614 per scheduling grant 610. The scheduling entity may transmit the configured maximum number 602 of multiple assignments via any suitable message or signal, including but not limited to a radio resource control (RRC) message, a MAC control element (MAC-CE) message, a DCI message, etc.

In some examples, the scheduling entity may transmit to the scheduled entity, a single scheduling grant 610 including the multiple assignments configured to assign resources that carry multiple communications 612, 614 based on the configured maximum number 602 of multiple assignments per scheduling grant. However, according to an aspect of the present disclosure, a scheduling entity may dynamically or selectively assign resources for any number of communications 612, 614 in a DCI, which may be less than or equal to a configured maximum number 602 of multiple assignments for multiple corresponding communications per scheduling grant. As described herein, a scheduling entity may provide for this selective or dynamic multiple-communication resource assignment by employing the use of non-scheduling assignments 624, 632 for corresponding disabled communications. Here, a non-scheduling assignment 624, 632 may correspond to information in a scheduling grant that is configured for multiple-communication resource assignments. Here, a non-scheduling assignment 624, 634 does not assign resources for a communication. In some examples, the non-scheduling assignment 624, 634 may disable a communication by using a predetermined value or symbol in a communication indicator of a scheduling grant 620, 630. The communication without assigned resources by a non-scheduling assignment 624, 632 may be indicated as 'disabled.' Such a multiple-communication resource assignment, may further include one or more scheduling assignments 612, 614, 622, 634 assigning wireless resources for one or more corresponding communications over one or more slots. Here, a scheduling assignment is to assign resources for a communication. The resource-assigned communication may be indicated as 'enabled.' The one or more scheduling assignments 612, 614, 622, 634 for one or more enabled communications within a given DCI may be less than the configured maximum number 602 of the multiple assignments per scheduling grant 610. The number of non-scheduling assignments and the number of scheduling assignments per scheduling grant may sum to the configured maximum number of assignments for multiple corresponding communications. Thus, if the number of scheduling assignments 612, 614, 622, 634 is less than the configured maximum number 602 of multiple assignments per scheduling grant 610, 620, 630, the number of non-scheduling assignments 624, 632 may be the number of the remaining configured assignments in the configured maximum number 602 of multiple assignments subtracting the number of scheduling assignments 612, 614, 622, 634.

In some examples, the scheduling entity may transmit the one or more scheduling assignments and the one or more non-scheduling assignments per scheduling grant in an ordered sequence. In some examples, the one or more scheduling assignments 612, 614, 622, 634 may be arranged in a contiguous group in an ordered sequence. The ordered sequence may preserve an order of the one or more first scheduling assignments 612, 614, 622, 634. The scheduling grant 610, 620, 630 may map the one or more enabled communications (e.g., TBs or sets of TBs) to the first wireless resources based on the order of the one or more corresponding first scheduling assignments 612, 614, 622, 634 in the ordered sequence. For example, a scheduling grant 610, 620, 630 can schedule up to two (2) communications (communication 1 and communication 2). The scheduling grant 620 may include assignment 1 (scheduling assignment) for assigning resources for communication 1 (enabled communication 1), and assignment 2 (non-scheduling assignment) that does not assign resources for communication 2 (disabled TB 2). Then, the scheduling grant may map enabled communication 1 to the first set of DMRS ports, the first frequency domain resource assignment (FDRA) in frequency, and/or the first time domain resource assignment (TDRA) in time. In the other examples, if a scheduling grant 630 can schedule up to two (2) communications (communication 1 and communication 2). The scheduling grant may include assignment 1 (non-scheduling assignment) that does not assign resources for communication 1 (disabled communication 1), and assignment 2 (scheduling assignment) for assigning resources for communication 2 (enabled communication 2). Then, the scheduling grant may sill map enabled communication 2 to the first set of DMRS ports, the first frequency domain resource assignment (FDRA) in frequency, and/or the first time domain resource assignment (TDRA) in time.

According to a further aspect of the disclosure, a scheduling entity may indicate that a particular assignment within a multiple-communication resource assignment is a non-scheduling assignment 624, 634 by using a predetermined value or symbol in the scheduling grant 620, 630. A non-scheduling assignment 624, 634 using one or more predetermined values in the scheduling grant 620, 630 may disable a communication (e.g., a TB or a set of TBs). That is, a scheduling entity may indicate a non-scheduling assignment by configuring that assignment with a predetermined value or symbol for indicating that the one or more assignments do not assign wireless resources for one or more corresponding communications. In some examples, a non-scheduling assignment may include one or more information elements including a predetermined value or symbol indicating that the non-scheduling assignment does not assign wireless resources. The one or more information elements may be in a communication indicator in a scheduling grant for a corresponding communication. In some examples, the scheduling entity may provide such the one or more elements having the predetermined value or symbol includes at least one of: a modulation and coding scheme index (MCS or $I_{MCS}$) field 711, or a redundancy version (RV) field 713 associated with the corresponding non-scheduling assignment 756. For example, the scheduling entity may set the MCS field as '26' and the RV field as '1' for a non-scheduling assignment 624, 634 in a scheduling grant 620, 630 for indicating that the non-scheduling assignment 624, 634 does not assign wireless resources for a corresponding TB. That is, the non-scheduling assignment in the scheduling grant may disable the corresponding TB. In some examples, a single non-scheduling assignment may disable a set of TBs by setting the MCS field as '26' and the RV field as '1' for each TB of the set of TBs. However, it should be appreciated that the MCS field, the RV field, and their predetermined values are a mere example to indicate a non-scheduling assignment 624, 634. For example, the scheduling entity may indicate a non-scheduling assignment 624, 634 by using any other field in a scheduling grant 620, 630 (e.g., an explicit bit for each communication indicating enabling or disabling the communication in a scheduling grant). Also, the scheduling entity may use other predetermined values or symbols in the MCS field and/or the RV field to indicate a non-scheduling assignment 624, 634.

In some examples, the scheduling grant 610 may further include a TCI codepoint mapping scheduling or non-scheduling assignments to corresponding TCI states. A TCI code-point 606 in the scheduling grant 610 may include one or more TCI state indicators mapping scheduling/non-scheduling assignments or one or more communication indicators to corresponding TCI states. The scheduling/non-scheduling assignments or one or more communication indicators may be for corresponding enabled communications (e.g., enabled TBs or sets of TBs) and/or one or more disabled communications (e.g., disabled TBs or sets of TBs). The one or more TCI state indicators in the TCI codepoint 616 may map the scheduling or non-scheduling assignments for enabled and/or disabled communications to corresponding TCI states. In some examples, since the scheduling grant 610 does not assign resources for a disabled communication, a TCI state mapped to a non-scheduling assignment may not actually be applicable to a disabled communication or may not point to the actual disabled communication. That is, although a TCI state indicator mapped to a non-scheduling assignment for a disabled communication may point to a TCI state, there is nothing for the TCI state to be mapped to actual resources assigned for the disabled communication. The TCI codepoint 616 may map a configured maximum number 612, 614 of the multiple assignments per scheduling grant to the corresponding number of TCI states regardless of the number of scheduling assignments, which may be less than the configured maximum number of the multiple assignments. Thus, the scheduling entity may need one codepoint for multiple-communication assignments even though the number of scheduling assignments is less than the configured maximum number of the multiple assignments in a single scheduling grant 610.

For example, a scheduling entity may transmit a maximum number 602 of assignments, which is two (2) to a scheduled entity. Thus, a scheduling grant may schedule up to two (2) communications (communication 1, communication 2). Scheduling grant 1 (610) may include two (2) scheduling assignments (scheduling assignment 1 (612), scheduling assignment 2 (614)) assigning resources for corresponding two (2) communications (communication 1 and communication 2). The two scheduling assignments (612), (614) may include two corresponding communication indicators (communication indicator 1 (612), communication indicator 2 (614)) mapped to corresponding communication 1 and communication 2. Codepoint 1 may map communication indicator 1 (612) associated with communication 1 to TCI state 1. Codepoint 1 may further map communication indicator 2 (614) associated with communication 2 to TCI state 2. A control message 606 may activate TCI state 1 and TCI state 2. Scheduling grant 2 (620) may include one scheduling assignment (622) assigning resources for communication 1 and one non-scheduling assignment (624) for communication 2. The non-scheduling assignment (624) may disable communication 2 using predetermined values in two fields (e.g., MCS: 26 and RV: 1) of scheduling grant 2 (620). The scheduling entity does not need another TCI codepoint only mapping communication 1 to TCI state 1. Codepoint 1 may map communication indicator 1 associated with communication 1 to TCI state 1 and communication indicator 2 associated with disabled communication 2 to TCI state 2. However, since a non-scheduling assignment does not assign resources for disabled communication 2 (624), TCI state 2 may not be applicable to communication 2 mapped to communication indicator 2 (624). A control message 606 may activate TCI state 1 and TCI state 2 as well. Scheduling grant 3 (630) may include one non-scheduling assignment (632) for communication 1 and one scheduling assignment (634) assigning resources for communication 2. The non-scheduling assignment (632) may disable communication 1 using predetermined values in two fields (e.g., MCS: 26 and RV: 1) of scheduling grant 3 (630). The scheduling entity does not need to use another TCI codepoint to only map communication 2 to TCI state 2. Codepoint 1 may map communication indicator 1 associated with disabled communication 1 and communication indicator 2 associated with enabled communication 2 to TCI state 1 and TCI state 2, respectively. However, since the non-scheduling assignment (632) does not assign resources for disabled communication 1, TCI state 1 may not be applicable to communication 1. Accordingly, although scheduling grants 1, 2, and 3 may assign resources for different sets of communications (communication 1, communication 2, and communications 1 and 2), scheduling grants 1, 2, and 3 may use one TCI codepoint 1 mapped to activated TCI 1 and activated TCI 2. It should be appreciated that the maximum number of assignments and enabled or disabled communications above are a mere example. In some examples, the maximum number of assignments may be any suitable number N for multiple assignments in a single DCI message. In addition, the number of enabled communications and/or disabled communications may vary.

Figure 7:
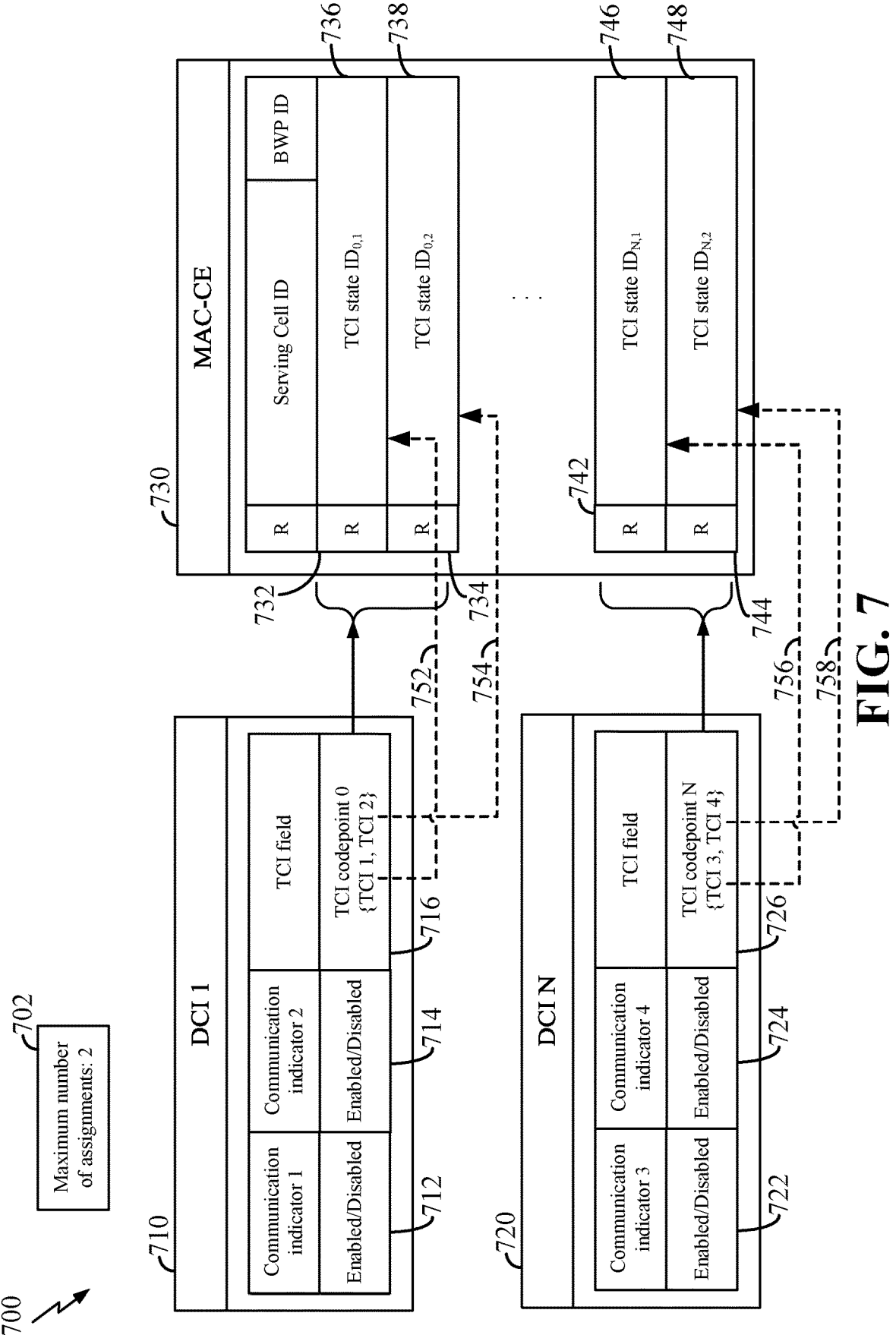
FIG. 7 is a schematic illustration of an example of a scheduling grant for multiple resource assignments and a control message for mapping communications to TCI states according to some embodiments.

FIG. 7 is a schematic illustration showing some aspects of an example of a scheduling grant (e.g., a DCI message, or DCI) for multiple resource assignments and a control message (e.g., an activation command, a MAC-CE message, or MAC-CE) for mapping communications (e.g., TBs, sets of TBs) to TCI states. In multiple-communication assignments in a single scheduling grant, the scheduling entity may transmit a control message 730 to activate or deactivate TCI states mapped to TCI codepoint 716 of a scheduling grant 710. In some examples, the control message 730 may activate all TCI states mapped to TCI state indicators of a TCI codepoint 716 of a scheduling grant 710. TCI state indicators of a TCI codepoint 716 may map corresponding communication indicators 712, 714 to corresponding TCI states. A corresponding communication indicator may indicate an enabled communication or a disabled communication. A TCI state mapped to a communication indicator indicating a disabled communication may be deactivated or may not be applicable to the disabled communication because there are no resources assigned for the disabled communication. Thus, in the examples, the control message 630 may not need to use a reserved field 732, 734, 742, 744 to control activation of TCI states because the control message 730 activates all TCI states associated with enabled or disabled communications. That is, the scheduling entity may control activation or deactivation of a TCI state by using a scheduling or non-scheduling assignment for a communication in a scheduling grant rather than using a control message. In some examples, presenting a TCI state ID 736, 738 in a control message 630 may indicate activation of a corresponding TCI state. In other examples, a predetermined value or symbol in the control message may activate or deactivate a TCI state. For example, the control message may use a value '1' in a field (e.g., $T_i$ field where i may indicate a TCI state identification) to activate a corresponding TCI state and a value '0' in the field to deactivate the corresponding TCI state. The field could be any other field or bit to activate or deactivate a TCI field.

In some examples, if a single scheduling grant (e.g., DCI) schedules two communications (e.g., TBs), and also indicates a TCI codepoint of two TCI states, then the UE may apply the two TCI states for reception or transmission of the two communications in order. In another example, if a single scheduling grant schedules a 1st enabled communication and a 2nd disabled communication, and also indicates a TCI codepoint of two TCI states, then the UE may apply the 1st TCI state of the TCI codepoint for reception or transmission of the 1st enabled TB, and ignore the 2nd TCI state of the TCI codepoint. In another example, if a single scheduling grant schedules a 1st disabled communication and a 2nd enabled communication, and also indicates a TCI codepoint of two TCI states, then the UE may apply the 2nd TCI state of the TCI codepoint for reception or transmission of the 2nd enabled communication, and ignore the 1st TCI state of the TCI codepoint.

In some examples, a single control message 730 may activate one or more TCI states corresponding to one or more codepoints 716, 726 in one or more scheduling grants 710, 720. A TCI codepoint 716, 726 may include one or more TCI state indicators 752, 754, 756, 758 mapping one or more communication indicators 712, 714, 722, 724 corresponding to scheduling or non-scheduling assignments to one or more TCI states 736, 738, 746, 748. The total number of the one or more TCI state indicators may be the same as the maximum number 702 of assignments by a single scheduling grant. A single control message 730 may activate all one or more TCI states 736, 738, 746, 748 mapped to the one or more TCI codepoints 716, 726. For example, a maximum number 702 of assignments may be two (2). Scheduling grant 1 (710) may include two scheduling or non-scheduling assignments for communication 1 (712) and communication 2 (714). Scheduling grant 1 (710) may further include TCI codepoint 0 (716). TCI codepoint 0 (716) may include TCI state indicator 1 (752) associated with enabled/disabled communication 1 (712) and TCI state indicator 2 (754) associated with enabled/disabled communication 2 (714). TCI state indicator 1 (752) may map communication indicator 1 (712) corresponding to scheduling/non-scheduling assignment 1 to TCI state 1 (736). TCI state indicator 2 (754) may map communication indicator 2 (714) corresponding to scheduling/non-scheduling assignment 2 to TCI state 2 (738). If communication indicator 1 or 2 indicates a non-scheduling assignment or communication 1 or 2 is disabled, corresponding TCI state 1 or 2 may not be applicable to communication 1 or 2, respectively. That is, scheduling grant 1 does not assign resources for disabled communication 1 or 2 to be mapped to TCI state 1 or TCI state 2. A single control message 730 may activate TCI state 1 and TCI state 2. In some examples, containing TCI state IDs for TCI state 1 and TCI state 2 in the single control message 730 may indicate activation of TCI state 1 and TCI state 2. Here, the single control message 730 may not use a reserved field 732, 734 for activating or deactivating a TCI state. In some examples, the single control message 730 may use a reserved field 732, 734 to activate all TCI states mapped to a codepoint. In other examples, the single control message 730 may include a predetermined value or symbol to activate TCI state 1 and TCI state 2 mapped to corresponding indicator 1 and indicator 2 of TCI codepoint 0 of scheduling grant 1.

In the examples above, the single control message 730 may also activate TCI states 746, 748 mapped to another TCI codepoint 726 of scheduling grant N 720. Another TCI codepoint 726 may also include two TCI state indicators 756, 758 which is the same as the maximum number of assignments by scheduling grant N 720. Two TCI state indicators 756, 758 may map corresponding two communication indicators 722, 724 corresponding scheduling/non-scheduling assignments for enabled/disabled communications to two corresponding TCI states 746, 748. It should be appreciated that the maximum number of assignments by a single scheduling grant may not be limited to two (2) used in the examples above. In some examples, the maximum number of assignments by a single scheduling grant may be more than two (2). Then, a TCI codepoint may map more than two (2) communication indicators corresponding more than two (2) scheduling/non-scheduling assignments for more than two (2) enabled/disabled communications to more than two (2) corresponding TCI states. Thus, a single control message 730 may activate all TCI states mapped to more than two (2) TCI state indicators of a TCI codepoint. In addition, the single control message 730 may also activate other TCI states mapped to another TCI codepoint including more than other two TCI state indicators.

Figure 8:
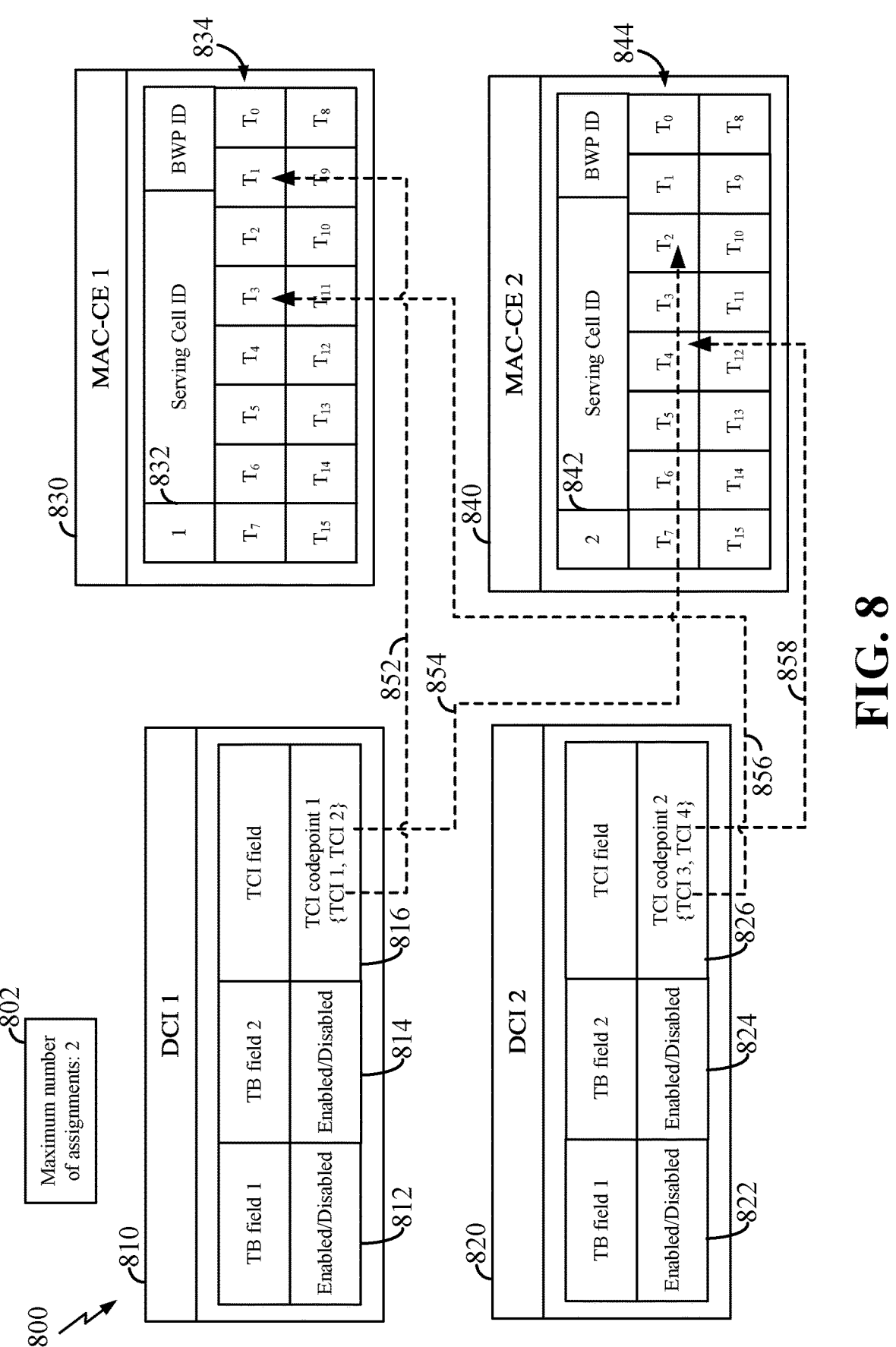
FIG. 8 is a schematic illustration of an example of a scheduling grant for multiple resource assignments and multiple control messages for mapping communications to TCI states according to some embodiments.

FIG. 8 is a schematic illustration showing some aspects of an example of a scheduling grant (e.g., a DCI message or DCI) for efficient multiple resource assignments and multiple control messages (e.g., activation commands, MAC-CE messages, or MAC-CE) for mapping communications (e.g., TBs, sets of TBs) to TCI states. For example, a maximum number 802 of assignments may be two (2). Scheduling grant 1 (810) may include two scheduling or non-scheduling assignments for communication 1 (812) and communication 2 (814) in an ordered sequence. Scheduling grant 1 (810) may further include TCI codepoint 1 (816). TCI codepoint 1 (816) may include TCI state indicator 1 (852) corresponding to scheduling/non-scheduling assignment 1 (812) for enabled/disabled communication 1 and TCI state indicator 2 (854) corresponding to scheduling/non-scheduling assignment 2 (814) for enabled/disabled communication 2. TCI state Indicator 1 (852) may map scheduling/non-scheduling assignment 1 (812) for enabled/disabled communication 1 to TCI state 1. TCI state indicator 2 (854) may map scheduling/non-scheduling assignment 2 (814) for enabled/disabled communication 2 (814) to TCI state 2. If communication 1 or 2 is disabled or scheduling/non-scheduling assignment 1 or 2 is a non-scheduling assignment, corresponding TCI state 1 or 2 may not be applicable to communication 1 or 2, respectively. Scheduling grant 2 (820) may include also scheduling/non-scheduling assignment 3 (822) for enabled/disabled communication 3 and scheduling/non-scheduling assignment 4 (824) for enabled/disabled communication 4 in an ordered sequence. Scheduling grant 2 (820) may further include TCI codepoint 2 (826). TCI codepoint 2 (826) may include TCI state indicator 3 (856) corresponding to scheduling/non-scheduling assignment 3 (822) and TCI state indicator 4 (858) scheduling/non-scheduling assignment 4 (824). Indicator 3 (856) may map scheduling/non-scheduling assignment 3 (822) for enabled/disabled communication 3 to TCI state 3. Indicator 4 (858) may map scheduling/non-scheduling assignment 4 (824) for enabled/disabled communication 4 (824) to TCI state 4.

In some examples, multiple control messages in an ordered sequence may activate multiple corresponding TCI states mapped to multiple corresponding TCI state indicators of one or more codepoints in the ordered sequence. In some examples, control message 1 (830) and control message 2 (840) may be arranged in an ordered sequence having positions (1st position: control message 1; and 2nd position: control message 2) of the control messages 1 and 2 (830, 840). Indicator 1 (852) and indicator 2 (854) of TCI codepoint 1 (816) of scheduling grant 1 (810) may be arranged in an ordered sequence having same positions (1st position: indicator 1; and 2nd position: indicator 2) of indicators 1 and 2 (852, 854) as the positions of control messages 830, 840. Indicator 3 (856) and indicator 4 (858) of TCI codepoint 2 (840) of scheduling grant 2 (820) may be arranged in an ordered sequence having same positions (1st position: indicator 3; and 2nd position: indicator 4) of indicators 3 and 4 (856, 858) as the positions of control messages 830, 840. Control messages 1 and 2 (830, 840) at the corresponding positions (1st position and 2nd position) of the ordered sequence are configured to activate the corresponding TCI states (TCI states 1 and 2) at the corresponding positions of the ordered sequence. The corresponding TCI states (TCI states 1 and 2) are mapped to the corresponding TCI state indicators (TCI states 1 and 2) at the corresponding positions (1st position and 2nd position) of the ordered sequence. For example, control message 1 (830) (1st position) may be configured to activate TCI state 1 (1st position) mapped to indicator 1 (852) (1st position) of codepoint 1 and activate TCI state 3 (1st position) mapped to indicator 3 (856) (1st position) of codepoint 2. Control message 2 (840) (2nd position) may be configured to activate TCI state 2 (1st position and 2nd position) mapped to indicator 2 (854) (1st position and 2nd position) of codepoint 1 and activate TCI state 4 (1st position and 2nd position) mapped to indicator 4 (858) (1st position and 2nd position) of codepoint 2. This is a mere example. In other examples, an Nth 832, 842 control message 830, 840 may be configured to activate a Nth TCI state of each codepoint 816, 826. For example, the first control message may be configured to activate the first TCI state of each codepoint. The second control message may be configured to activate the second TCI state of each codepoint. The Nth MAC-CE message may be configured to activate the Nth TCI state of each codepoint of multiple codepoints. In the examples, a TCI state may correspond to a separate panel. Thus, activated N TCI states may correspond to N panels to transmission or reception. In some examples, a predetermined value or symbol in a control message 830, 840 may activate or deactivate a TCI state 834, 844. For example, the control message may use a value '1' in a field (e.g., $T_i$ field where i may indicate a TCI state identification) to activate a corresponding TCI state and a value '0' in the field to deactivate the corresponding TCI state. The field could be any other field or bit to activate or deactivate a TCI field.

Figure 9:
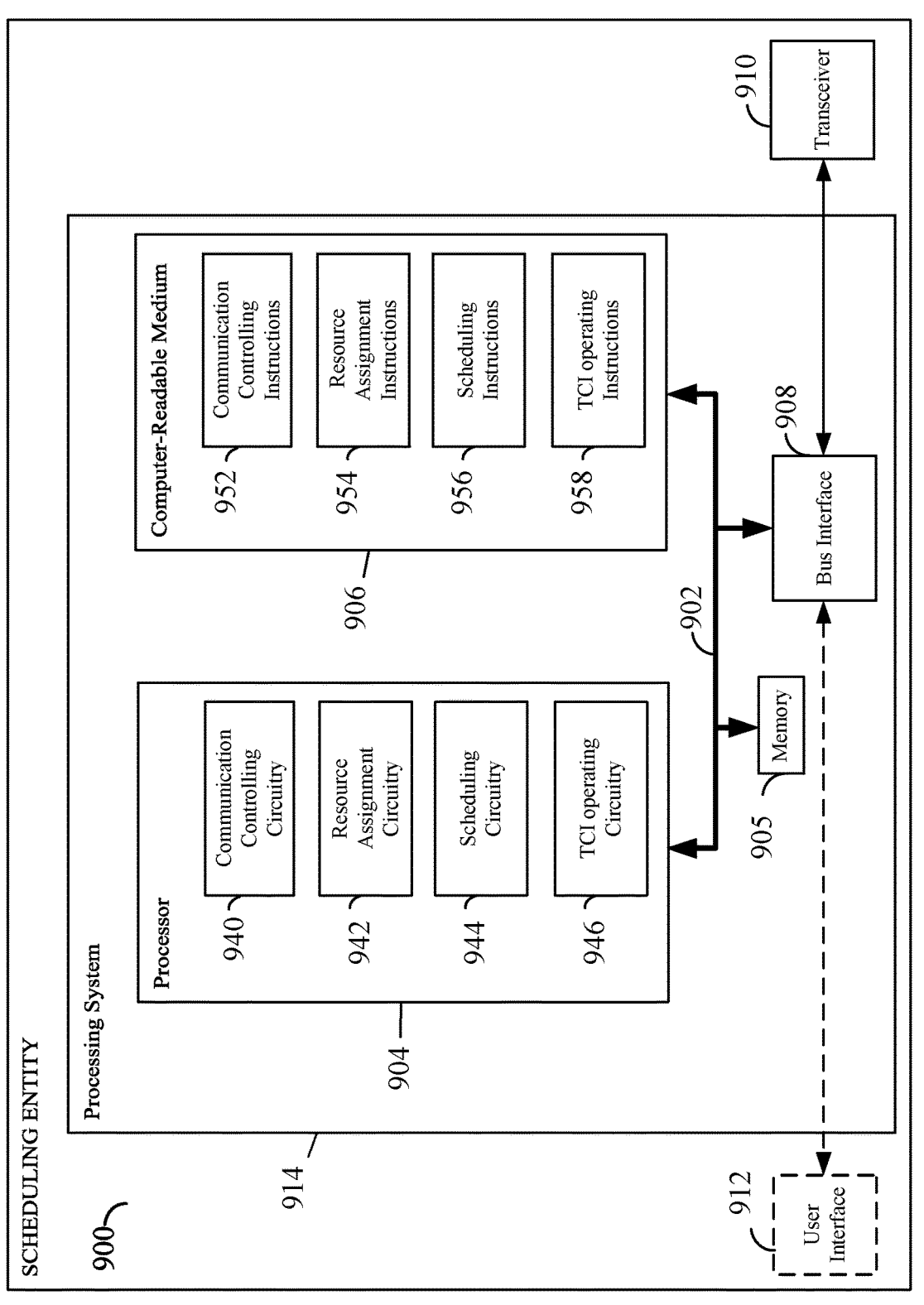
FIG. 9 is a block diagram conceptually illustrating an example of a hardware implementation for a scheduling entity according to some embodiments.

FIG. 9 is a block diagram illustrating an example of a hardware implementation for a scheduling entity 900 employing a processing system 914. For example, the scheduling entity 900 may be a user equipment (UE) as illustrated in any one or more of FIGS. 1, 2, 3, and/or 5-8. In another example, the scheduling entity 900 may be a base station as illustrated in any one or more of FIGS. 1, 2, 3, and/or 5-8.

The scheduling entity 900 may include a processing system 914 having one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be configured (e.g., in coordination with the memory 905) to implement any one or more of the processes and procedures described below and illustrated in FIG. 11.

The processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium. Depending upon the nature of the apparatus, a user interface 912 (e.g., keypad, display, speaker, microphone, joystick) may also be provided. Of course, such a user interface 912 is optional, and some examples, such as a base station, may omit it.

In some aspects of the disclosure, the processor 904 may include communication controlling circuitry 940 configured (e.g., in coordination with the memory 905) for various functions, including, e.g., transmitting a scheduling grant including one or more first scheduling assignments, one or more non-scheduling assignments, and a codepoint to a scheduled entity; communicating the one or more TBs with the scheduled entity; and/or transmitting one or more control messages for activating one or more TCI states. For example, the communication controlling circuitry 940 may be configured to implement one or more of the functions described below in relation to FIG. 11, including, e.g., blocks 1118, 1120, and/or 1122.

In some aspects of the disclosure, the processor 904 may further include resource assignment circuitry 942 configured (e.g., in coordination with the memory 905) for various functions, including, e.g., assigning wireless resources for one or more corresponding enabled communications; and/or mapping the one or more enabled communications to the wireless resources in an ordered sequence. For example, the resource assignment circuitry 942 may be configured to implement one or more of the functions described below in relation to FIG. 11, including, e.g., block 1114.

In some aspects of the disclosure, the processor 904 may further include scheduling circuitry 944 configured (e.g., in coordination with the memory 905) for various functions, including, e.g., generating one or more non-scheduling assignments without assigning wireless resources for one or more corresponding disabled TBs; using a predetermined value in the scheduling grant indicating that scheduling grant does not assign resources for a disabled communication; and/or using a predetermined value in at least one of: a redundancy version (RV) field, or a modulation and coding scheme index (MCS) field associated with the corresponding non-scheduling assignment. For example, the scheduling circuitry 944 may be configured to implement one or more of the functions described below in relation to FIG. 11, including, e.g., blocks 1112 and/or 1118.

In some aspects of the disclosure, the processor 904 may further include transmission configuration indicator (TCI) operating circuitry 946 configured (e.g., in coordination with the memory 905) for various functions, including, e.g., configuring a codepoint including TCI state indicators corresponding to enabled or disabled communications mapped to TCI states; mapping enabled and disabled communications to TCI states; configuring a control message (e.g., a MAC-CE message) to activate TCI states; configuring a single control message to activate TCI states mapped to multiple codepoints; and/or configuring multiple control messages to activate multiple corresponding TCI states mapped to multiple corresponding TCI state indicators of each of one or more codepoints in the ordered sequence. For example, the TCI operating circuitry 946 may be configured to implement one or more of the functions described below in relation to FIG. 11, including, e.g., blocks 1116, 1118, and/or 1120.

The processor 904 is responsible for managing the bus 902 and general processing, including the execution of software stored on the computer-readable medium 906. The software, when executed by the processor 904, causes the processing system 914 to perform the various functions described below for any particular apparatus. The processor 904 may also use the computer-readable medium 906 and the memory 905 for storing data that the processor 904 manipulates when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may store computer-executable code that includes communication controlling instructions 952 that configure a scheduling entity 900 for various functions, including, e.g., transmitting a scheduling grant including one or more first scheduling assignments, one or more non-scheduling assignments, and a codepoint to a scheduled entity; communicating the one or more TBs with the scheduled entity; and/or transmitting one or more control messages for activating one or more TCI states. For example, the communication controlling instructions 952 may be configured to cause a scheduling entity 900 to implement one or more of the functions described below in relation to FIG. 11, including, e.g., blocks 1118, 1120, and/or 1122.

In one or more examples, the computer-readable storage medium 906 may store computer-executable code that includes resource assignment instructions 954 that configure a scheduling entity 900 for various functions, including, e.g., assigning wireless resources for one or more corresponding enabled communications; and/or mapping the one or more enabled communications to the wireless resources in an ordered sequence. For example, the resource assignment instructions 954 may be configured to cause a scheduling entity 900 to implement one or more of the functions described below in relation to FIG. 11, including, e.g., block 1114.

In one or more examples, the computer-readable storage medium 906 may store computer-executable code that includes scheduling instructions 956 that configure a scheduling entity 900 for various functions, including, e.g., generating one or more non-scheduling assignments without assigning wireless resources for one or more corresponding disabled TBs; using a predetermined value in the scheduling grant indicating that scheduling grant does not assign resources for a disabled communication; and/or using a predetermined value in at least one of: a redundancy version (RV) field, or a modulation and coding scheme index (MCS) field associated with the corresponding non-scheduling assignment. For example, the scheduling instructions 956 may be configured to cause a scheduling entity 900 to implement one or more of the functions described below in relation to FIG. 11, including, e.g., blocks 1112, and/or 1118.

In one or more examples, the computer-readable storage medium 906 may store computer-executable code that includes TCI operating instructions 958 that configure a scheduling entity 900 for various functions, including, e.g., configuring a codepoint including TCI state indicators corresponding to enabled or disabled communications mapped to TCI states; mapping enabled and disabled communications to TCI states; configuring a control message (e.g., a MAC-CE message) to activate TCI states; configuring a single control message to activate TCI states mapped to multiple codepoints; and/or configuring multiple control messages to activate multiple corresponding TCI states mapped to multiple corresponding TCI state indicators of each of one or more codepoints in the ordered sequence. For example, the TCI operating instructions 958 may be configured to cause a scheduling entity 900 to implement one or more of the functions described below in relation to FIG. 11, including, e.g., blocks 1116, 1118, and/or 1120.

In one configuration, the apparatus 900 for wireless communication includes means for transmitting a scheduling grant to a scheduled entity, means for transmitting a scheduling grant including one or more first scheduling assignments, one or more non-scheduling assignments, and a codepoint to a scheduled entity; communicating the one or more TBs with the scheduled entity; transmitting one or more control messages for activating one or more TCI states; assigning wireless resources for one or more corresponding enabled communications; mapping the one or more enabled communications to the wireless resources in an ordered sequence; generating one or more non-scheduling assignments without assigning wireless resources for one or more corresponding disabled TBs; using a predetermined value in the scheduling grant indicating that scheduling grant does not assign resources for a disabled communication; using a predetermined value in at least one of: a redundancy version (RV) field, or a modulation and coding scheme index (MCS) field associated with the corresponding non-scheduling assignment; configuring a codepoint including TCI state indicators corresponding to enabled or disabled communications mapped to TCI states; mapping enabled and disabled communications to TCI states; configuring a control message (e.g., a MAC-CE message) to activate TCI states; configuring a single control message to activate TCI states mapped to multiple codepoints; and/or configuring multiple control messages to activate multiple corresponding TCI states mapped to multiple corresponding TCI state indicators of each of one or more codepoints in the ordered sequence. In one aspect, the aforementioned means may be the processor(s) 904 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 3, and/or 5-8, and utilizing, for example, the processes and/or algorithms described herein in relation to FIG. 11.

Figure 10:
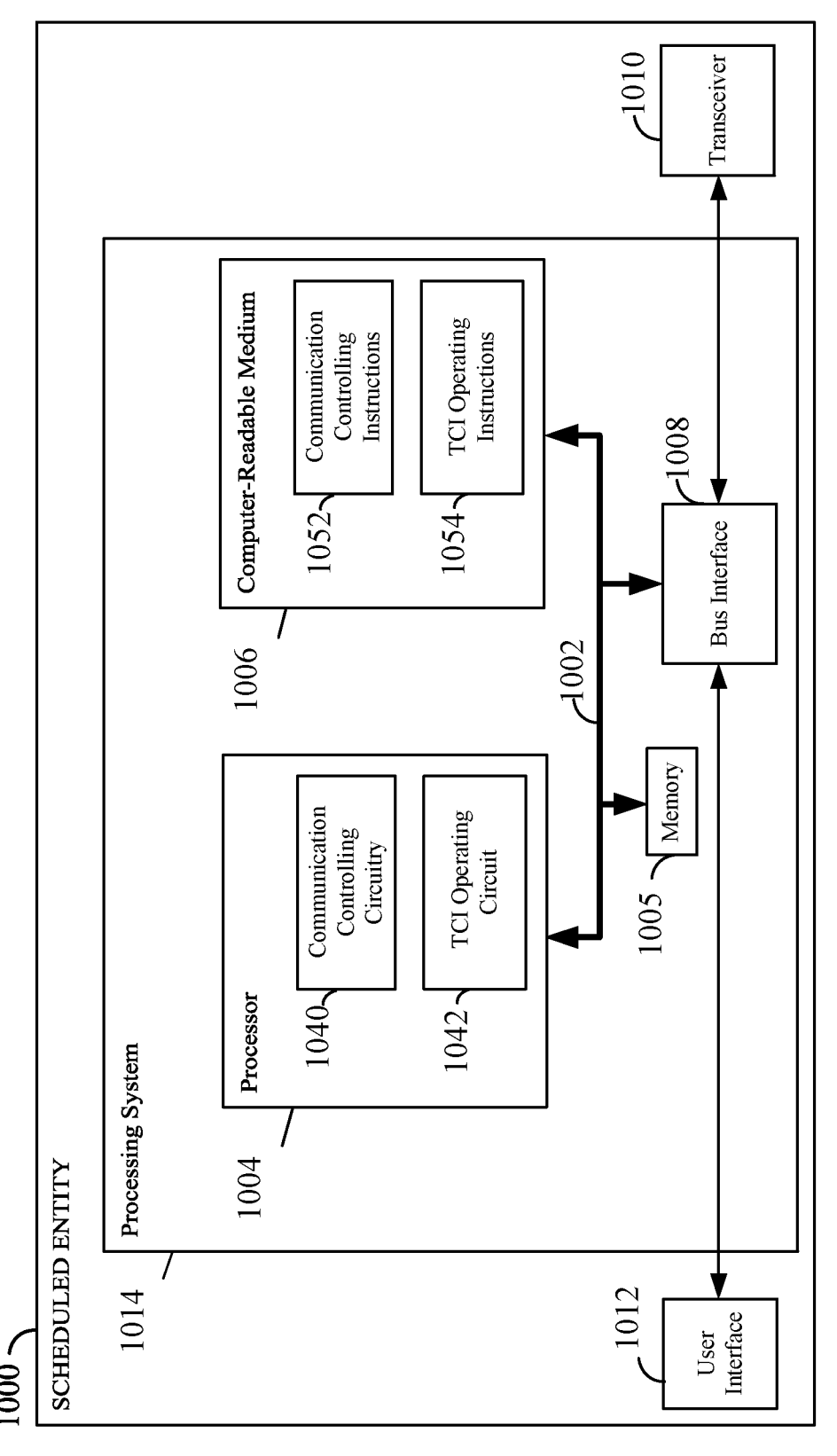
FIG. 10 is a block diagram conceptually illustrating an example of a hardware implementation for a scheduled entity according to some embodiments.

FIG. 10 is a conceptual diagram illustrating an example of a hardware implementation for an exemplary scheduled entity 1000 employing a processing system 1014. In accordance with various aspects of the disclosure, a processing system 1014 may include an element, or any portion of an element, or any combination of elements having one or more processors 1004. For example, the scheduled entity 1000 may be a user equipment (UE) as illustrated in any one or more of FIGS. 1, 2, 3, and/or 5-8.

The processing system 1014 may be substantially the same as the processing system 914 illustrated in FIG. 9, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 9. That is, the processor 1004, as utilized in a scheduled entity 1000, may be configured (e.g., in coordination with the memory 1005) to implement any one or more of the processes described below and illustrated in FIG. 11.

In some aspects of the disclosure, the processor 1004 may include communication controlling circuitry 1040 configured (e.g., in coordination with the memory 1005) for various functions, including, for example, receiving a scheduling grant including one or more first scheduling assignments, one or more non-scheduling assignments, and a codepoint to a scheduled entity; communicating the one or more TBs with the scheduled entity; and/or receiving one or more control messages for activating one or more TCI states. For example, the communication controlling circuitry 1040 may be configured to implement one or more of the functions described below in relation to FIG. 11, including, e.g., blocks 1138, 1140, and/or 1142.

In some aspects of the disclosure, the processor 1004 may further include TCI operating circuitry 1042 configured (e.g., in coordination with the memory 1005) for various functions, including, for example, determining characteristics of communication transmission/reception beam based on a corresponding TCI state. For example, the TCI operating circuitry 1042 may be configured to implement one or more of the functions described below in relation to FIG. 11, including, e.g., block 1140.

And further, the computer-readable storage medium 1006 may store computer-executable code that includes communication controlling instructions 1052 that configure a scheduled entity 1000 for various functions, including, e.g., receiving a scheduling grant including one or more first scheduling assignments, one or more non-scheduling assignments, and a codepoint to a scheduled entity; communicating the one or more TBs with the scheduled entity; and/or receiving one or more control messages for activating one or more TCI states. For example, the communication controlling instructions 1052 may be configured to cause a scheduled entity 1000 to implement one or more of the functions described below in relation to FIG. 11, including, e.g., blocks 1138, 1140, and/or 1142.

The computer-readable storage medium 1006 may further store computer-executable code that includes TCI operating instructions 1054 that configure a scheduled entity 1000 for various functions, including, e.g., determining characteristics of communication transmission/reception beam based on a corresponding TCI state. For example, the TCI operating instructions 1054 may be configured to cause a scheduled entity 1000 to implement one or more of the functions described below in relation to FIG. 11, including, e.g., block 1140.

In one configuration, the apparatus 1000 for wireless communication includes means for receiving a scheduling grant including one or more first scheduling assignments, one or more non-scheduling assignments, and a codepoint to a scheduled entity; communicating the one or more TBs with the scheduled entity; receiving one or more control messages for activating one or more TCI states; and/or determining characteristics of communication transmission/reception beam based on a corresponding TCI state. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, 3 and/or 5-8, and utilizing, for example, the processes and/or algorithms described herein in relation to FIG. 11.

FIG. 11 is a flow chart illustrating an exemplary process 1100 at a scheduled entity for multiple-communication assignments with a single scheduling grant and one or more control messages for mapping communications to TCI states in accordance with some aspects of the present disclosure. As described below, a particular implementation may omit some or all illustrated features, and may not require some illustrated features to implement all embodiments. In some examples, the scheduled entity 1000 illustrated in FIG. 10 may be configured to carry out the process 1100. In some examples, any suitable apparatus or means for carrying out the functions or algorithm described below may carry out the process 1100.

In some aspects of the disclosure, the scheduled entity may receive an efficient single scheduling grant (e.g., a DCI message or DCI) including scheduling assignments assigning wireless resources for enabled communications (e.g., TBs or sets of TBs) and non-scheduling assignments that do not assign wireless resources for disabled communications. Here, an enabled communication may be a communication for which wireless resources are assigned, while a disabled communication may be a communication that does not assigned resources. Thus, a disabled communication may not be an existent or actual communication. Thus, one of benefits may be, but is not limited to, saving unnecessary resources by using the non-scheduling assignments.

Further, the single scheduling grant may further include a codepoint (e.g., TCI codepoint) for mapping scheduling and/or non-scheduling assignments to corresponding TCI states. The scheduled entity may receive a control message for activating the TCI states. Since a non-scheduling assignment in a scheduling grant does not assign resources for a communication, a TCI state corresponding to the non-scheduling assignment may not actually be applicable to a communication or may not point to an actual communication. That is, a scheduling or non-scheduling assignment for a communication rather than a control message (e.g., an activation command, a MAC-CE message, or MAC-CE) may control activation or deactivation of a TCI state. Thus, the scheduled entity may not need to receive multiple codepoints for different sets of communications to be mapped to different sets of TCI states because one codepoint may map enabled and disabled communications to TCI states. Some benefits for using non-scheduling assignments may be, but are not limited to, reduced DCI overhead and efficient resource management.

At block 1112, the scheduled entity may receive one or more control messages (e.g., an activation command, a MAC-CE message, or MAC-CE) for activating the one or more first TCI states mapped to one or more first TCI state indicators in a codepoint and activating the one or more second TCI states mapped to one or more second TCI state indicators in the codepoint. A scheduling grant may indicate the codepoint. In some examples, a scheduled entity may receive a TCI related parameter to configure a number of TCI states before receiving the scheduling grant and/or the one or more control messages. The TCI related parameter may be transmitted via any suitable message or signal, including but not limited to a RRC message, a MAC-CE message, a DCI message, etc.

In further examples, the scheduled entity may receive one or more control messages before receiving a corresponding scheduling grant. The one or more control messages may activate configured TCI states. Then, a codepoint in a scheduling grant may map corresponding scheduling and/or non-scheduling assignments in the scheduling grant to the activated TCI states.

In some examples, one or more control messages may activate all TCI states mapped to a codepoint to be indicated in a scheduling grant. In particular, one or more control messages may activate all TCI states mapped to corresponding TCI state indicators in a codepoint to be indicated a scheduling grant. The TCI state indicators may map corresponding scheduling and/or non-scheduling assignments to corresponding TCI states. Since a non-scheduling assignment does not assign resources for a disabled communication, a TCI state corresponding to the non-scheduling assignment may not be applicable to a communication.

In some examples, the scheduled entity may further receive one or more second scheduling grants. Each of the one or more second scheduling grants may include a second codepoint and one or more second scheduling or non-scheduling assignments. Each of the one or more second codepoints may include one or more third TCI state indicators. The one or more control messages may be a single control message configured to activate the one or more first TCI states and the one or more second TCI states mapped to a codepoint. A first scheduling grant may map the codepoint to first one or more TCI state indicators and one or more second TCI state indicators in the codepoint of the first scheduling grant. The single control message may be further configured to activate one or more third TCI states to be mapped to the third TCI state indicators.

In some examples, a single control message may activate all TCI states to be mapped to all TCI state indicators of a codepoint of a scheduling grant. In some examples, the single control message may include a reserved field to indicate activation of all TCI states mapped to a codepoint. In other examples, the single control message may not use the reserved field. Rather, containing a TCI state ID for a TCI state in the single control message may indicate activation of the TCI state. In other examples, the scheduled entity may know that the scheduling entity activates all TCI states mapped to a codepoint to be indicated in a scheduling grant. In other examples, the single control message may include a predetermined value or symbol to activate a TCI state mapped to a corresponding TCI state indicator of a TCI codepoint to be indicated in a scheduling grant.

In further examples, the single control message may also activate other TCI states to be mapped to all TCI state indicators of a codepoint of each of one or more different scheduling grants. Thus, the single control message may jointly activate TCI states mapped to multiple codepoints. For example, the control message may activate all nine (9) total TCI states for three (3) codepoints in a single control message. The scheduling entity, then, may transmit three (3) scheduling grants. Each scheduling grant may include three (3) scheduling or non-scheduling assignments for different enabled communications or disabled communications. Each scheduling grant may also include a codepoint including three (3) TCI state indicators mapping the three (3) scheduling or non-scheduling assignments to three (3) TCI states. Thus, nine (9) activated TCI states are mapped to nine (9) different scheduling or non-scheduling assignments for enabled or disabled communications.

In other examples, the one or more control messages may be multiple control messages. The multiple control messages may be arranged in an ordered sequence having positions of the one or more control messages. The scheduled entity may further receive one or more second scheduling grants. Each second scheduling grant may include a second codepoint and at least one of: one or more second scheduling assignments, or one or more second non-scheduling assignments. Each second codepoint may include one or more fourth TCI state indicators. Each second scheduling grant may map third TCI states to the one or more corresponding fourth TCI state indicators of a respective codepoint of each second scheduling grant. In some examples, the third TCI states may be arranged in the ordered sequence having same positions as the one or more control messages. In some examples, the third TCI states further including the one or more first TCI states and the one or more second TCI states may be arranged in the ordered sequence having same positions as the one or more control messages. In some aspects, the one or more control messages at the corresponding positions of the ordered sequence may be configured to activate the third TCI states at the corresponding positions in the ordered sequence.

The one or more fourth TCI state indicators of each of the one or more second codepoints may be arranged in a fourth ordered sequence having same positions of the one or more fourth TCI state indicators as the positions of the first ordered sequence. The one or more control messages at the corresponding positions of the first ordered sequence may be configured to activate the corresponding third TCI states at the corresponding positions of the first ordered sequence mapped to the corresponding third TCI state indicators at the corresponding positions of the first ordered sequence. The one or more control messages at the corresponding positions of the first ordered sequence may be further configured to activate one or more corresponding fourth TCI states at the corresponding positions of the first ordered sequence. The fourth TCI states may be mapped to the one or more corresponding fourth TCI state indicators at the corresponding positions of the first ordered sequence of each of the one or more second codepoints in the ordered sequence.

Multiple control messages may be arranged in an ordered sequence. Each scheduling grant may include a codepoint including TCI state indicators mapping corresponding scheduling or non-scheduling assignments to corresponding TCI states in the same sequence as the ordered sequence. The multiple control messages may activate the corresponding TCI states corresponding to the TCI state indicators of the codepoint of each scheduling grant of the multiple scheduling grants in the ordered sequence. In short, the multiple control messages in an ordered sequence may activate multiple corresponding TCI states to be mapped to multiple corresponding TCI state indicators of each of one or more codepoints in the ordered sequence. In some examples, a control message may use a value '1' in a field (e.g., $T_i$ field where i may indicate a TCI state identification) to activate a corresponding TCI state and a value '0' in the field to deactivate the corresponding TCI state. The field could be any other field or bit to activate or deactivate a TCI field. Also, the predetermined value is a mere example. The control message may use a different value or symbol to activate or deactivate a TCI state.

At block 1114, the scheduled entity may receive a first scheduling grant from a scheduling entity. The first scheduling grant may include one or more first scheduling assignments configured to assign wireless resources for one or more corresponding enabled communications, one or more first non-scheduling assignments that do not assign wireless resources, and a first codepoint. A communication may include, but is not limited to, a set of any suitable number of one or more TBs, a packet or set of packets, a protocol data unit (PDU) or set of PDUs, etc. Here, a scheduling assignment is to assign resources for a communication. The resource-assigned communication may be indicated as 'enabled.'

A non-scheduling assignment may correspond to information in a scheduling grant that is configured for multiple-communication resource assignments. Here, a non-scheduling assignment does not assign resources for a communication. In some examples, a non-scheduling assignment may include one or more information elements including a predetermined value indicating that the non-scheduling assignment does not assign wireless resources. The one or more information elements may include at least one of: a redundancy version (RV) field, or a modulation and coding scheme (MCS) field. For example, a scheduling grant may set the MCS field as '26' and the RV field as '1' for a non-scheduling assignment in the scheduling grant for indicating that the non-scheduling assignment does not assign wireless resources for a corresponding TB. In some examples, a single non-scheduling assignment may disable a set of TBs by setting the MCS field as '26' and the RV field as '1' for each TB of the set of TBs. However, it should be appreciated that the MCS field, the RV field, and their predetermined values are a mere example to indicate a non-scheduling assignment. Thus, a non-scheduling assignment may disable a communication or disable scheduling a communication by using a predetermined value or symbol in a scheduling grant. The number of non-scheduling assignments and the number of scheduling assignments per scheduling grant may sum to a configured maximum number of assignments for multiple corresponding communications per scheduling grant.

In some examples, the one or more first scheduling assignments may be arranged in a contiguous group in an ordered sequence. The one or more enabled communications may be mapped to the assigned wireless resources based on the order of the one or more corresponding first scheduling assignments in the ordered sequence.

For example, a scheduling grant can schedule up to three (3) communications (communication 1, communication 2, and communication 3). Of course, the number of communications to be scheduled here is a mere example. The scheduling grant assigns resources for communication 1 (enabled communication 1) and communication 3 (enabled communication 3), and does not assign resources for communication 2 (disabled communication 2). Then, the scheduling grant may map enabled communication 1 to the first set of DMRS ports, the first frequency domain resource assignment (FDRA) in frequency, and/or the first time domain resource assignment (TDRA) in time. The scheduling grant may also map enabled communication 3 to the second set of DMRS ports, the second frequency domain resource assignment (FDRA) in frequency, and/or the second time domain resource assignment (TDRA) in time. The first set of resources and the second set of resources are arranged in a contiguous group in an ordered sequence. In the other examples, the scheduling grant does not assign resources for communication 1 (disabled communication 1), and assigns resources for communication 2 (enabled communication 2) and communication 3 (enabled communication 3). Then, the scheduling grant may sill map enabled communication 2 to the first set of resources. The scheduling grant may also map enabled communication 3 to the second set of resources. The first set of resources and the second set of resources are arranged in a contiguous group in an ordered sequence.

The scheduling grant may further include a codepoint. The codepoint may include one or more first TCI state indicators corresponding to the one or more first scheduling assignments. The codepoint may further include one or more second TCI state indicators corresponding to the one or more first non-scheduling assignments. The one or more first TCI state indicators may map the one or more scheduling assignments for the one or more enabled communications to one or more corresponding first TCI states. The one or more second TCI state indicators may also map the one or more non-scheduling assignments to one or more corresponding second TCI states. In some examples, the control message at block 1112 may already activate the first and second TCI states.

In some aspects of the disclosure, since a non-scheduling assignment of a scheduling grant does not assign resources for a communication, a TCI state corresponding to a non-scheduling assignment may not actually be applicable to a communication or may not point to the actual communication. Thus, a codepoint in a scheduling grant may map scheduling and non-scheduling assignments to TCI states although a TCI state does not applicable to a communication for a non-scheduling assignment. The total number of TCI state indicators in a codepoint may be the same as the configured maximum number of assignments per scheduling grant. A scheduling grant may have one codepoint regardless of the number of scheduling assignments for enabled communications. In some examples, one or more first TCI state indicators in a codepoint of a scheduling grant and the one or more second TCI state indicators in the codepoint of the scheduling grant may be arranged in the same sequence as one or more first scheduling assignments and one or more first non-scheduling assignments in the scheduling grant.

For example, the scheduled entity may receive three (3) scheduling grants (scheduling grant 1, scheduling grant 2, and scheduling grant 3). Each scheduling grant may include three (3) scheduling or non-scheduling assignments (assignments 1-9) for three (3) enabled or disabled communications (communication 1-9). Each scheduling grant may further include a codepoint (codepoint 1-3) including three (3) TCI state indicators (indicator 1-9) mapping the enabled or disabled communications (communication 1-9) to three (3) corresponding TCI states (TCI 1-9) as a table shown below.

| Scheduling grant 1 | Scheduling grant 3 | Scheduling grant 3 |
|---|---|---|
| Assignment 1 for communication 1 | Assignment 4 for communication 4 | Assignment 7 for communication 7 |
| Assignment 2 for communication 2 | Assignment 5 for communication 5 | Assignment 8 for communication 8 |
| Assignment 3 for communication 3 | Assignment 6 for communication 6 | Assignment 9 for communication 9 |
| Codepoint 1 {indicator 1 for TCI 1, indicator 2 for TCI 2, and indicator 3 for TCI 3} | Codepoint 2 {indicator 4 for TCI 4, indicator 5 for TCI 5, and indicator 6 for TCI 6} | Codepoint 3 {indicator 7 for TCI 7, indicator 8 for TCI 8, and indicator 9 for TCI 9} |

The scheduled entity may also receive three (3) control messages (control message 1, control message 2, and control message 3) in an ordered sequence for activating nine (9) TCI states for three (3) corresponding panel transmissions. In some examples, the scheduled entity may receive the control messages before receiving the scheduling grants. The first control message in the order may activate first TCIs to be mapped in three codepoints in the three scheduling grants. Thus, control message 1 may activate TCI 1 to be mapped to TCI state indicator 1 of codepoint 1, TCI 4 to be mapped to TCI state indicator 4 of codepoint 2, and TCI 7 to be mapped to TCI state indicator 7 of codepoint 3. The second control message in the order may activate second TCIs to be mapped in three codepoints in the three scheduling grants. Thus, control message 2 may activate TCI 2 to be mapped to TCI state indicator 2 of codepoint 1, TCI 5 to be mapped to TCI state indicator 5 of codepoint 2, and TCI 8 to be mapped to TCI state indicator 8 of codepoint 3. Lastly, the third control message in the order may activate third TCIs to be mapped in three codepoints in the three scheduling grants. Thus, control message 3 may activate TCI 3 to be mapped to TCI state indicator 3 of codepoint 1, TCI 6 to be mapped to TCI state indicator 6 of TCI state codepoint 2, and TCI 9 to be mapped to TCI state indicator 9 of codepoint 3. A table shown below summarizes the activation of TCI states by the multiple control messages.

| Control message 1 | Activating TCI state 1 mapped to indicator 1 of codepoint 1, TCI state 4 mapped to indicator 4 of codepoint 2, and TCI state 7 mapped to indicator 7 of codepoint 3 |
|---|---|
| Control message 2 | Activating TCI state 2 mapped to indicator 2 of codepoint 1, TCI state 5 mapped to indicator 5 of codepoint 2, and TCI state 8 mapped to indicator 8 of codepoint 3 |

-continued

| Control message 3 | Activating TCI state 3 mapped to indicator 3 of codepoint 1, TCI state 6 mapped to indicator 6 of codepoint 2, and TCI state 9 mapped to indicator 9 of codepoint 3 |
|---|---|

At block 1116, the scheduled entity may communicate the one or more enabled communications with the scheduling entity utilizing the assigned wireless resources. For example, the scheduled entity may receive one or more enabled communications scheduled by one or more scheduling assignments on wireless resources on one or more PDSCHs assigned by a single scheduling grant (e.g., using DCI Format 1_0, DCI Format 1_1, or DCI Format 1_2). In other example, the scheduled entity may transmit one or more enabled communications scheduled by one or more scheduling assignments on resources on one or more PUSCHs assigned by a single scheduling grant (e.g., using DCI Format 0_1, DCI Format 0_1, or DCI Format 0_2).

FIG. 12 is a flow chart illustrating an exemplary process 1200 at a scheduling entity for multiple-communication assignments with a single scheduling grant and one or more control messages for mapping communications to TCI states in accordance with some aspects of the present disclosure. As described below, a particular implementation may omit some or all illustrated features, and may not require some illustrated features to implement all embodiments. In some examples, the scheduling entity 900 illustrated in FIG. 9 may be configured to carry out the process 1200. In some examples, any suitable apparatus or means for carrying out the functions or algorithm described below may carry out the process 1200.

At block 1212, the scheduling entity may transmit one or more control messages (e.g., an activation command, a MAC-CE message, or MAC-CE) for activating TCI states mapped to one or more codepoints in one or more scheduling grant. In some examples, a scheduling entity may transmit a TCI related parameter for a scheduled entity to configure a number of TCI states before the scheduling entity transmits the scheduling grant and/or the one or more control messages. The scheduling entity may transmit a TCI related parameter via any suitable message or signal, including but not limited to a RRC message, a MAC-CE message, a DCI message, etc.

In further examples, the scheduling entity may transmit one or more control messages before transmitting a corresponding scheduling grant. The scheduling entity may activate configured TCI states using a control message. Then, the scheduling entity may map scheduling and/or non-scheduling assignments to the activated TCI states using corresponding TCI state indicators in a codepoint of a scheduling grant.

In some examples, one or more control messages may activate all TCI states to be mapped to a codepoint in a scheduling grant. In particular, one or more control messages may activate all TCI states to be mapped to corresponding TCI state indicators in a codepoint of a scheduling grant.

In some examples, the one or more control messages may be a single control message. The single control message may activate all TCI states to be mapped to all TCI for a codepoint. A scheduling grant may indicate the codepoint. In some examples, the single control message may include a reserved field to indicate activation of all TCI states mapped to a codepoint. In other examples, the single control message may not use the reserved field. Rather, containing a TCI state ID for a TCI state in the single control message may indicate activation of the TCI state. In other examples, the scheduled entity may know that the scheduling entity activates all TCI states mapped to a codepoint to be indicated in a scheduling grant. In other examples, the single control message may include a predetermined value or symbol to activate a TCI state mapped to a corresponding TCI state indicator of a TCI codepoint of a scheduling grant.

In further examples, the single control message may also activate other TCI states to be mapped to all TCI state indicators of a codepoint of each of one or more different scheduling grants. Thus, the single control message may jointly activate TCI states mapped to multiple codepoints. For example, a control message may activate all nine (9) total TCI states mapped to the three (3) codepoints in a single control message. A scheduling entity may transmit three (3) scheduling grants. Each scheduling grant may include three (3) scheduling or non-scheduling assignments for different enabled communications or disabled communications. Each scheduling grant may also include a codepoint including three (3) TCI state indicators mapping the three (3) enabled or disabled communications to three (3) activated TCI states. Thus, nine (9) activated TCI states for nine (9) different may be mapped to enabled or disabled communications.

In other examples, the one or more control messages may be multiple control messages. The multiple control messages may be arranged in an ordered sequence having positions of the one or more control messages. The scheduling entity may further transmit one or more second scheduling grants. Each second scheduling grant may include a second codepoint and at least one of: one or more second scheduling assignments, or one or more second non-scheduling assignments. Each second codepoint may include one or more fourth TCI state indicators. Each second scheduling grant may map third TCI states to the one or more corresponding fourth TCI state indicators of a respective codepoint of each second scheduling grant. In some examples, the third TCI states may be arranged in the ordered sequence having same positions as the one or more control messages. In some examples, the third TCI states further including the one or more first TCI states and the one or more second TCI states may be arranged in the ordered sequence having same positions as the one or more control messages. In some aspects, the one or more control messages at the corresponding positions of the ordered sequence may be configured to activate the third TCI states at the corresponding positions in the ordered sequence.

In some examples, the multiple control messages may be arranged in an ordered sequence. Each scheduling grant may include a codepoint including TCI state indicators mapping corresponding scheduling or non-scheduling assignments to corresponding TCI states in the same sequence as the ordered sequence. The multiple control messages may activate the corresponding TCI states corresponding to the TCI state indicators of the codepoint of each scheduling grant of the multiple scheduling grants in the ordered sequence. In short, the multiple control messages in an ordered sequence may activate multiple corresponding TCI states mapped to multiple corresponding TCI state indicators of each of one or more codepoints in the ordered sequence. In some examples, a control message may use a value '1' in a field (e.g., $T_i$ field where i may indicate a TCI state identification) to activate a corresponding TCI state and a value '0' in the field to deactivate the corresponding TCI state. The field could be any other field or bit to activate or deactivate a TCI field. Also, the predetermined value is a mere example. The control message may use a different value or symbol to activate or deactivate a TCI state.

At block 1214, the scheduling entity may configure a scheduling grant (e.g., a DCI message) for multiple communications to be enabled or disabled. The scheduling grant may include one or more scheduling assignments configured to assign wireless resources for one or more corresponding enabled communications and one or more non-scheduling assignments without assigning wireless resources. A communication may include, but is not limited to, a set of any suitable number of one or more TBs, a packet or set of packets, a protocol data unit (PDU) or set of PDUs, etc. A resource-assigned communication may be indicated as 'enabled.' The scheduling entity may disable a communication using one or more predetermined values or symbols in the scheduling grant. That is, the scheduling entity may disable scheduling resources for a communication. One or more predetermined values or symbols for a corresponding non-scheduling assignment in the scheduling grant may indicate that the scheduling entity does not assign resources for the communication. In some examples, the scheduling entity may provide such one or more predetermined values in at least one of: a modulation and coding scheme index (MCS or $I_{MCS}$) field, or a redundancy version (RV) field associated with the corresponding non-scheduling assignment. For example, the scheduling entity may set the MCS field as '26' and the RV field as '1' for a non-scheduling assignment in a scheduling grant for indicating that the non-scheduling assignment does not assign wireless resources for a corresponding communication. That is, the non-scheduling assignment in the scheduling grant may disable the corresponding communication.

At block 1216, the scheduling entity may configure the scheduling grant for one or more scheduling assignments to assign resources for one or more enabled communications. In some examples, one or more scheduling assignments in the scheduling grant may be arranged in a contiguous group in an ordered sequence. The scheduling entity may map one or more enabled communications to wireless resources based on the order of the one or more corresponding first scheduling assignments in the ordered sequence.

For example, a scheduling grant can schedule up to three (3) communications (communication 1, communication 2, and communication 3). Of course, the number of communications scheduled is a mere example. The scheduling grant assigns resources for communication 1 (enabled communication 1) and communication 3 (enabled communication 3), and does not assign resources for communication 2 (disabled communication 2). Then, the scheduling grant may map enabled communication 1 to the first set of DMRS ports, the first frequency domain resource assignment (FDRA) in frequency, and/or the first time domain resource assignment (TDRA) in time. The scheduling grant may also map enabled communication 3 to the second set of DMRS ports, the second frequency domain resource assignment (FDRA) in frequency, and/or the second time domain resource assignment (TDRA) in time. The first set of resources and the second set of resources are arranged in a contiguous group in an ordered sequence. In the other examples, the scheduling grant does not assign resources for communication 1 (disabled communication 1), and assigns resources for communication 2 (enabled communication 2) and communication 3 (enabled communication 3). Then, the scheduling grant may sill map enabled communication 2 to the first set of resources. The scheduling grant may also map enabled communication 3 to the second set of resources. The first set of resources and the second set of resources are arranged in a contiguous group in an ordered sequence.

At block 1218, the scheduling entity may further indicate a codepoint (e.g., TCI codepoint) in the scheduling grant. The codepoint may include one or more TCI state enablement and disablement indicators mapped to activated TCI states. The one or more first TCI state indicators may correspond to the one or more scheduling assignments for one or more enabled communications. The one or more second TCI state indicators may correspond to the one or more non-scheduling assignments. The one or more first TCI state indicators may map the one or more scheduling assignments for the one or more enabled communications to one or more corresponding first TCI states. The one or more second TCI state indicators may also map the one or more non-scheduling assignments to one or more corresponding second TCI states. In some examples, one or more first TCI state indicators in a codepoint of a scheduling grant and the one or more second TCI state indicators in the codepoint of the scheduling grant may be arranged in the same sequence as one or more first scheduling assignments and one or more first non-scheduling assignments in the scheduling grant.

In some aspects of the disclosure, since a non-scheduling assignment in a scheduling grant does not assign resources for a communication, a TCI state corresponding to the non-scheduling assignment may not actually be applicable to a communication or may not point to an actual disabled communication. That is, although a TCI state indicator corresponding to a non-scheduling assignment may point to a TCI state, there is nothing for the TCI state to be mapped to actual resources assigned for a communication. Thus, a codepoint in a scheduling grant may map scheduling and non-scheduling assignments to TCI states. The total number of TCI state indicators may be the same as the configured maximum number of assignments per scheduling grant. A scheduling grant may have one codepoint regardless of the number of scheduling assignments for enabled communications. The scheduling grant may not need to generate an additional codepoint only mapping enabled communications, which are less than the maximum number of assignments, to corresponding TCI states.

At block 1220, the scheduling entity may transmit a single scheduling grant including one or more scheduling assignments, one or more non-scheduling assignments, and a codepoint. The one or more scheduling assignments may assign wireless resources for one or more corresponding enabled communications. The one or more non-scheduling assignments may not assign wireless resources. The codepoint may include one or more first TCI state indicators mapping corresponding to the one or more scheduling assignments to corresponding TCI states. The codepoint may further include one or more second TCI state indicators mapping the one or more non-scheduling assignments to corresponding TCI states. However, as explained above, a TCI state corresponding to a non-scheduling assignment may not be applicable to a communication.

For example, the scheduling entity may transmit three (3) scheduling grants (scheduling grant 1, scheduling grant 2, and scheduling grant 3). Each scheduling grant may include three (3) scheduling or non-scheduling assignments (assignments 1-9) for three (3) enabled or disabled communications (communication 1-9). Each scheduling grant may further include a codepoint (codepoint 1-3) including three (3) TCI state indicators (indicator 1-9) mapping the enabled or disabled communications (communication 1-9) to three (3) corresponding TCI states (TCI 1-9) as a table shown below.

| Scheduling grant 1 | Scheduling grant 3 | Scheduling grant 3 |
| --- | --- | --- |
| Assignment 1 for communication 1 | Assignment 4 for communication 4 | Assignment 7 for communication 7 |
| Assignment 2 for communication 2 | Assignment 5 for communication 5 | Assignment 8 for communication 8 |
| Assignment 3 for communication 3 | Assignment 6 for communication 6 | Assignment 9 for communication 9 |
| Codepoint 1 {indicator 1 for TCI 1, indicator 2 for TCI 2, and indicator 3 for TCI 3} | Codepoint 2 {indicator 4 for TCI 4, indicator 5 for TCI 5, and indicator 6 for TCI 6} | Codepoint 3 {indicator 7 for TCI 7, indicator 8 for TCI 8, and indicator 9 for TCI 9} |

The scheduling entity may use three (3) control messages (control message 1, control message 2, and control message 3) in an ordered sequence for activating nine (9) TCI states for three (3) corresponding panel transmissions. In some examples, the scheduling entity may transmit the control messages before the scheduling grants. The first control message in the order may activate first TCIs mapped in three codepoints. The scheduling grants may indicate the three codepoints. Thus, control message 1 may activate TCI 1 mapped to TCI state indicator 1 of codepoint 1, TCI 4 mapped to TCI state indicator 4 of codepoint 2, and TCI 7 mapped to TCI state indicator 7 of codepoint 3. The second control message in the order may activate second TCIs mapped in three codepoints in the three scheduling grants. Thus, control message 2 may activate TCI 2 mapped to TCI state indicator 2 of codepoint 1, TCI 5 mapped to TCI state indicator 5 of codepoint 2, and TCI 8 mapped to TCI state indicator 8 of codepoint 3. Lastly, the third control message in the order may activate third TCIs mapped in three codepoints in the three scheduling grants. Thus, control message 3 may activate TCI 3 mapped to TCI state indicator 3 of codepoint 1, TCI 6 mapped to TCI state indicator 6 of codepoint 2, and TCI 9 mapped to TCI state indicator 9 of codepoint 3. Then, three (3) scheduling grants indicates codepoint 1, codepoint 2, and codepoint 3, respectively. A table shown below summarizes the activation of TCI states by the multiple control messages.

| Control message 1 | Activating TCI state 1 mapped to indicator 1 of codepoint 1, TCI state 4 mapped to indicator 4 of codepoint 2, and TCI state 7 mapped to indicator 7 of codepoint 3 |
| --- | --- |
| Control message 2 | Activating TCI state 2 mapped to indicator 2 of codepoint 1, TCI state 5 mapped to indicator 5 of codepoint 2, and TCI state 8 mapped to indicator 8 of codepoint 3 |
| Control message 3 | Activating TCI state 3 mapped to indicator 3 of codepoint 1, TCI state 6 mapped to indicator 6 of codepoint 2, and TCI state 9 mapped to indicator 9 of codepoint 3 |

At block 1222, the scheduling entity may communicate the one or more enabled communications with the scheduled entity utilizing the assigned wireless resources. For example, the scheduling entity may transmit one or more enabled communications scheduled by one or more scheduling assignments on wireless resources on one or more PDSCHs assigned by a single scheduling grant (e.g., using DCI Format 1_0, DCI Format 1_1, or DCI Format 1_2). In other example, the scheduling entity may receive one or more enabled communications scheduled by one or more scheduling assignments on resources on one or more PUSCHs assigned by a single scheduling grant (e.g., using DCI Format 0_1, DCI Format 0_1, or DCI Format 0_2).

Further Examples Having a Variety of Features

Example 1: A method, apparatus, and non-transitory computer-readable medium of wireless communication operable at a scheduled entity, comprising: receiving a first scheduling grant from a scheduling entity, the first scheduling grant comprising: one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and communicating the one or more enabled communications with the scheduling entity utilizing the assigned wireless resources.

Example 2: The method, apparatus, and non-transitory computer-readable medium of Example 1, wherein a number of non-scheduling assignments and the number of scheduling assignments sum to a configured maximum number of assignments for multiple corresponding communications per scheduling grant.

Example 3: The method, apparatus, and non-transitory computer-readable medium of any of Examples 1 to 2, wherein a non-scheduling assignment of the one or more first non-scheduling assignments comprises one or more information elements including a predetermined value indicating that the non-scheduling assignment does not assign wireless resources.

Example 4: The method, apparatus, and non-transitory computer-readable medium of any of Examples 1 to 3, wherein the one or more information elements comprises at least one of: a redundancy version (RV) field, or a modulation and coding scheme (MCS) field.

Example 5: The method, apparatus, and non-transitory computer-readable medium of any of Examples 1 to 4, wherein the one or more first scheduling assignments are arranged in a contiguous group in an ordered sequence, and wherein the one or more enabled communications are mapped to the assigned wireless resources based on the order of the one or more corresponding first scheduling assignments in the ordered sequence.

Example 6: The method, apparatus, and non-transitory computer-readable medium of any of Examples 1 to 5, wherein the one or more first TCI state indicators and the one or more second TCI state indicators are arranged in a same sequence as the one or more first scheduling assignments and the one or more first non-scheduling assignments.

Example 7: The method, apparatus, and non-transitory computer-readable medium of any of Examples 1 to 6, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

Example 8: The method, apparatus, and non-transitory computer-readable medium of any of Examples 1 to 7, further comprising: receiving one or more control messages for activating the one or more first TCI states and the one or more second TCI states.

Example 9: The method, apparatus, and non-transitory computer-readable medium of any of Examples 1 to 8, wherein the one or more control messages is a single control message, and wherein the single control message is configured to activate the one or more first TCI states and the one or more second TCI states.

Example 10: The method, apparatus, and non-transitory computer-readable medium of any of Examples 1 to 9, further comprising: receiving one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

Example 11: The method, apparatus, and non-transitory computer-readable medium of any of Examples 1 to 10, wherein the one or more control messages are arranged in an ordered sequence having positions of the one or more control messages, wherein the method, apparatus, and non-transitory computer-readable medium further comprises receiving one or more second scheduling grants each comprising a second codepoint and at least one of: one or more second scheduling assignments, or one or more second non-scheduling assignments, each second codepoint of the one or more second scheduling grants comprising one or more fourth TCI state indicators, wherein each second scheduling grant of the one or more second scheduling grant may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

Example 12: A method, apparatus, and non-transitory computer-readable medium of wireless communication operable at a scheduling entity, comprising: transmitting a first scheduling grant from a scheduling entity, the first scheduling grant comprising: one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and communicating the one or more enabled communications with the scheduled entity utilizing the assigned wireless resources.

Example 13: The method, apparatus, and non-transitory computer-readable medium of Example 12, wherein a number of non-scheduling assignments and the number of scheduling assignments sum to a configured maximum number of assignments for multiple corresponding communications per scheduling grant.

Example 14: The method, apparatus, and non-transitory computer-readable medium of any of Examples 12 to 13, wherein a non-scheduling assignment of the one or more first non-scheduling assignments comprises one or more information elements including a predetermined value indicating that the non-scheduling assignment does not assign wireless resources.

Example 15: The method, apparatus, and non-transitory computer-readable medium of any of Examples 12 to 14, wherein the one or more information elements comprises at least one of: a redundancy version (RV) field, or a modulation and coding scheme (MCS) field.

Example 16: The method, apparatus, and non-transitory computer-readable medium of any of Examples 12 to 15, wherein the one or more first scheduling assignments are arranged in a contiguous group in an ordered sequence, and wherein the one or more enabled communications are mapped to the assigned wireless resources based on the order of the one or more corresponding first scheduling assignments in the ordered sequence.

Example 17: The method, apparatus, and non-transitory computer-readable medium of any of Examples 12 to 16, wherein the one or more first TCI state indicators and the one or more second TCI state indicators are arranged in a same sequence as the one or more first scheduling assignments and the one or more first non-scheduling assignments.

Example 18: The method, apparatus, and non-transitory computer-readable medium of any of Examples 12 to 17, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

Example 19: The method, apparatus, and non-transitory computer-readable medium of any of Examples 12 to 18, further comprising: transmitting one or more control messages for activating the one or more first TCI states and the one or more second TCI states.

Example 20: The method, apparatus, and non-transitory computer-readable medium of any of Examples 12 to 19, wherein the one or more control messages is a single control message, and wherein the single control message is configured to activate the one or more first TCI states and the one or more second TCI states.

Example 21: The method, apparatus, and non-transitory computer-readable medium of any of Examples 12 to 20, further comprising: transmitting one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

Example 22: The method, apparatus, and non-transitory computer-readable medium of any of Examples 12 to 21, wherein the one or more control messages are arranged in an ordered sequence having positions of the one or more control messages, wherein the method, apparatus, and non-transitory computer-readable medium further comprises transmitting one or more second scheduling grants each comprising a second codepoint and at least one of: one or more second scheduling assignments, or one or more second non-scheduling assignments, each second codepoint of the one or more second scheduling grants comprising one or more fourth TCI state indicators, wherein each second scheduling grant of the one or more second scheduling grant may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

Example 23: A scheduled entity of wireless communication, comprising: means for receiving a first scheduling grant from a scheduling entity, the first scheduling grant comprising: one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and means for communicating the one or more enabled communications with the scheduling entity utilizing the assigned wireless resources.

Example 24: The scheduled entity of Example 23, wherein a number of non-scheduling assignments and the number of scheduling assignments sum to a configured maximum number of assignments for multiple corresponding communications per scheduling grant.

Example 25: The scheduled entity of any of Examples 23 to 24, wherein a non-scheduling assignment of the one or more first non-scheduling assignments comprises one or more information elements including a predetermined value indicating that the non-scheduling assignment does not assign wireless resources.

Example 26: The scheduled entity of any of Examples 23 to 25, wherein the one or more information elements comprises at least one of: a redundancy version (RV) field, or a modulation and coding scheme (MCS) field.

Example 26: The scheduled entity of any of Examples 23 to 25, wherein the one or more first scheduling assignments are arranged in a contiguous group in an ordered sequence, and wherein the one or more enabled communications are mapped to the assigned wireless resources based on the order of the one or more corresponding first scheduling assignments in the ordered sequence.

Example 27: The scheduled entity of any of Examples 23 to 26, wherein the one or more first TCI state indicators and the one or more second TCI state indicators are arranged in a same sequence as the one or more first scheduling assignments and the one or more first non-scheduling assignments.

Example 28: The scheduled entity of any of Examples 23 to 27, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

Example 29: The scheduled entity of any of Examples 23 to 28, further comprising: means for receiving one or more control messages for activating the one or more first TCI states and the one or more second TCI states.

Example 30: The scheduled entity of any of Examples 23 to 29, wherein the one or more control messages is a single control message, and wherein the single control message is configured to activate the one or more first TCI states and the one or more second TCI states.

Example 31: The scheduled entity of any of Examples 23 to 30, further comprising: means for receiving one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

Example 32: The scheduled entity of any of Examples 23 to 31, wherein the one or more control messages are arranged in an ordered sequence having positions of the one or more control messages, wherein the scheduled entity further comprises means for receiving one or more second scheduling grants each comprising a second codepoint and at least one of: one or more second scheduling assignments, or one or more second non-scheduling assignments, each second codepoint of the one or more second scheduling grants comprising one or more fourth TCI state indicators, wherein each second scheduling grant of the one or more second scheduling grant may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

Example 33: A scheduling entity of wireless communication comprising: means for transmitting a first scheduling grant from a scheduling entity, the first scheduling grant comprising: one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and means for communicating the one or more enabled communications with the scheduled entity utilizing the assigned wireless resources.

Example 34: The scheduling entity of Example 33, wherein a number of non-scheduling assignments and the number of scheduling assignments sum to a configured maximum number of assignments for multiple corresponding communications per scheduling grant.

Example 35: The scheduling entity of any of Examples 33 to 34, wherein a non-scheduling assignment of the one or more first non-scheduling assignments comprises one or more information elements including a predetermined value indicating that the non-scheduling assignment does not assign wireless resources.

Example 36: The scheduling entity of any of Examples 33 to 35, wherein the one or more information elements comprises at least one of: a redundancy version (RV) field, or a modulation and coding scheme (MCS) field.

Example 37: The scheduling entity of any of Examples 33 to 36, wherein the one or more first scheduling assignments are arranged in a contiguous group in an ordered sequence, and wherein the one or more enabled communications are mapped to the assigned wireless resources based on the order of the one or more corresponding first scheduling assignments in the ordered sequence.

Example 38: The scheduling entity of any of Examples 33 to 37, wherein the one or more first TCI state indicators and the one or more second TCI state indicators are arranged in a same sequence as the one or more first scheduling assignments and the one or more first non-scheduling assignments.

Example 39: The scheduling entity of any of Examples 33 to 38, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

Example 40: The scheduling entity of any of Examples 33 to 39, further comprising: means for transmitting one or more control messages for activating the one or more first TCI states and the one or more second TCI states.

Example 41: The scheduling entity of any of Examples 33 to 40, wherein the one or more control messages is a single control message, and wherein the single control message is configured to activate the one or more first TCI states and the one or more second TCI states.

Example 42: The scheduling entity of any of Examples 33 to 41, further comprising: means for transmitting one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

Example 43: The scheduling entity of any of Examples 33 to 42, wherein the one or more control messages are arranged in an ordered sequence having positions of the one or more control messages, wherein the scheduling entity further comprises means for transmitting one or more second scheduling grants each comprising a second codepoint and at least one of: one or more second scheduling assignments, or one or more second non-scheduling assignments, each second codepoint of the one or more second scheduling grants comprising one or more fourth TCI state indicators, wherein each second scheduling grant of the one or more second scheduling grant may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

This disclosure presents several aspects of a wireless communication network with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the term "coupled" to refer to a direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication operable at a scheduled entity, comprising:
   receiving a first scheduling grant from a scheduling entity, the first scheduling grant comprising:
      one or more first scheduling assignments configured to assign wireless resources for one or more corresponding enabled communications,
      one or more first non-scheduling assignments that do not assign wireless resources, and
      a first codepoint comprising one or more first TCI state indicators corresponding to the one or more first scheduling assignments and one or more second TCI state indicators corresponding to the one or more first non-scheduling assignments; and
   communicating the one or more enabled communications with the scheduling entity utilizing the assigned wireless resources by the one or more first scheduling assignments.

2. The method of claim 1, wherein a number of non-scheduling assignments and a number of scheduling assignments sum to a configured maximum number of assignments for multiple corresponding communications per scheduling grant.

3. The method of claim 1, wherein a non-scheduling assignment of the one or more first non-scheduling assignments comprises one or more information elements including a predetermined value indicating that the non-scheduling assignment does not assign wireless resources.

4. The method of claim 3, wherein the one or more information elements comprises at least one of: a redundancy version (RV) field, or a modulation and coding scheme (MCS) field.

5. The method of claim 1, wherein the one or more first scheduling assignments are arranged in a contiguous group in an ordered sequence, and
   wherein the one or more enabled communications are mapped to the assigned wireless resources based on the order of the one or more corresponding first scheduling assignments in the ordered sequence.

6. The method of claim 1, wherein the one or more first TCI state indicators and the one or more second TCI state indicators are arranged in a same sequence as the one or more first scheduling assignments and the one or more first non-scheduling assignments.

7. The method of claim 1, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

8. The method of claim 7, further comprising:

receiving one or more control messages for activating the one or more first TCI states and the one or more second TCI states.

9. The method of claim 8, wherein the one or more control messages is a single control message, and wherein the single control message is configured to activate the one or more first TCI states and the one or more second TCI states.

10. The method of claim 8, further comprising:

receiving one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

11. The method of claim 8, wherein the one or more control messages are arranged in an ordered sequence having positions of the one or more control messages, wherein the method further comprises receiving one or more second scheduling grants each comprising a second codepoint and at least one of: one or more second scheduling assignments, or one or more second non-scheduling assignments, the second codepoint of each second scheduling grant comprising one or more fourth TCI state indicators, wherein each second scheduling grant of the one or more second scheduling grants may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

12. A method of wireless communication operable at a scheduling entity, comprising:

transmitting a first scheduling grant from a scheduling entity, the first scheduling grant comprising:

one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and communicating the one or more enabled communications with the scheduled entity utilizing the assigned wireless resources.

13. The method of claim 12, wherein a number of non-scheduling assignments and a number of scheduling assignments sum to a configured maximum number of assignments for multiple corresponding communications per scheduling grant.

14. The method of claim 12, wherein a non-scheduling assignment of the one or more first non-scheduling assignments comprises one or more information elements including a predetermined value indicating that the non-scheduling assignment does not assign wireless resources.

15. The method of claim 14, wherein the one or more information elements comprises at least one of: a redundancy version (RV) field, or a modulation and coding scheme (MCS) field.

16. The method of claim 12, wherein the one or more first scheduling assignments are arranged in a contiguous group in an ordered sequence, and wherein the one or more enabled communications are mapped to the assigned wireless resources based on the order of the one or more corresponding first scheduling assignments in the ordered sequence.

17. The method of claim 12, wherein the one or more first TCI state indicators and the one or more second TCI state indicators are arranged in a same sequence as the one or more first scheduling assignments and the one or more first non-scheduling assignments.

18. The method of claim 12, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

19. The method of claim 18, further comprising:

transmitting one or more control messages for activating the one or more first TCI states and the one or more second TCI states.

20. The method of claim 19, wherein the one or more control messages is a single control message, and wherein the single control message is configured to activate the one or more first TCI states and the one or more second TCI states.

21. The method of claim 19, further comprising:

transmitting one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

22. The method of claim 19, wherein the one or more control messages are arranged in an ordered sequence having positions of the one or more control messages, wherein the method further comprises transmitting one or more second scheduling grants each comprising a second codepoint and at least one of: one or more second scheduling assignments, or one or more second non-scheduling assignments, the second codepoint of each second scheduling grant comprising one or more fourth TCI state indicators, wherein each second scheduling grant of the one or more second scheduling grants may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

23. A scheduled entity of wireless communication, comprising:

means for receiving a first scheduling grant from a scheduling entity, the first scheduling grant comprising:

one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and means for communicating the one or more enabled communications with the scheduling entity utilizing the assigned wireless resources.

24. The scheduled entity of claim 23, wherein a non-scheduling assignment of the one or more first non-scheduling assignments comprises one or more information elements including a predetermined value indicating that the non-scheduling assignment does not assign wireless resources.

25. The scheduled entity of claim 23, further comprising means for receiving one or more control messages for activating the one or more first TCI states and the one or more second TCI states, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

26. The scheduled entity of claim 25, further comprising means for receiving one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

27. The scheduled entity of claim 25, wherein the one or more control messages are arranged in an ordered sequence having positions of the one or more control messages, wherein the scheduled entity further comprises means for receiving one or more second scheduling grants each comprising a second codepoint and at least one of: one or more second scheduling assignments, or one or more second non-scheduling assignments, the second codepoint of each second scheduling grant comprising one or more fourth TCI state indicators, wherein each second scheduling grant of the one or more second scheduling grants may map third TCI states to the one or more corresponding fourth TCI state indicators of a respective codepoint of each second scheduling grant, wherein the third TCI states are arranged in the ordered sequence having same positions as the one or more control messages, wherein the third TCI states further comprising the one or more first TCI states and the one or more second TCI states are arranged in the ordered sequence having same positions as the one or more control messages, and wherein the one or more control messages at the corresponding positions of the ordered sequence are configured to activate the third TCI states at the corresponding positions in the ordered sequence.

28. A scheduling entity of wireless communication comprising:

means for transmitting a first scheduling grant from a scheduling entity, the first scheduling grant comprising:

one or more first scheduling assignments configured to assign wireless resources for one or more corresponding enabled communications, one or more first non-scheduling assignments that do not assign wireless resources, and a first codepoint comprising one or more first TCI state indicators corresponding to the one or more first scheduling assignments and one or more second TCI state indicators corresponding to the one or more first non-scheduling assignments; and means for communicating the one or more enabled communications with the scheduled entity utilizing the assigned wireless resources.

29. The scheduling entity of claim 28, further comprising means for transmitting one or more control messages for activating the one or more first TCI states and the one or more second TCI states, wherein the one or more first TCI state indicators map the one or more corresponding first scheduling assignments to one or more corresponding first transmission configuration indicator (TCI) states, and wherein the one or more second TCI state indicators map the one or more corresponding first non-scheduling assignments to one or more corresponding second TCI states.

30. The scheduling entity of claim 29, further comprising means for transmitting one or more second scheduling grants, each of the one or more second scheduling grants comprising a second codepoint and at least one of: one or more second scheduling assignments, or one or more second non-scheduling assignments, each of the one or more second codepoints comprising one or more third TCI state indicators, wherein the one or more control messages is a single control message configured to activate the one or more first TCI states and the one or more second TCI states, and wherein the single control message is further configured to activate one or more third TCI states mapped to the one or more corresponding third TCI state indicators.

\* \* \* \* \*